US008967607B2

(12) United States Patent
Ducek

(10) Patent No.: US 8,967,607 B2
(45) Date of Patent: Mar. 3, 2015

(54) MULTIFUNCTION WORK TABLE

(75) Inventor: Premysl Ducek, Aurora, CO (US)

(73) Assignee: Premysl-Uhrik, LLC, Littleton, CO (US)

( * ) Notice: Subject to any disclaimer, the term of this patent is extended or adjusted under 35 U.S.C. 154(b) by 897 days.

(21) Appl. No.: 12/985,008

(22) Filed: Jan. 5, 2011

(65) Prior Publication Data

US 2012/0169001 A1    Jul. 5, 2012

(51) Int. Cl.
*B23Q 3/00* (2006.01)
*A47B 3/00* (2006.01)
*B25H 1/02* (2006.01)
*B25H 1/10* (2006.01)
*B25H 1/14* (2006.01)

(52) U.S. Cl.
CPC .. *B25H 1/02* (2013.01); *B25H 1/10* (2013.01); *B25H 1/14* (2013.01)
USPC .......................................... 269/289 R; 108/18

(58) Field of Classification Search
USPC .............. 269/289 R, 293, 296; 108/163, 143, 108/158.12, 154, 157.1, 153.1, 155, 16, 34, 108/18; 211/186
See application file for complete search history.

(56) References Cited

U.S. PATENT DOCUMENTS

| | | | |
|---|---|---|---|
| 1,015,182 A * | 1/1912 | Herbin | 108/163 |
| 1,099,849 A * | 6/1914 | Hammond | 108/60 |
| 1,104,018 A * | 7/1914 | Thiss | 108/155 |
| 1,460,928 A | 7/1923 | Tilden | |
| 1,619,124 A * | 3/1927 | Hoszowski | 108/34 |
| 2,668,331 A * | 2/1954 | Horn | 108/171 |
| 2,784,812 A | 3/1957 | Kindorf | |
| 2,890,089 A * | 6/1959 | Sanchez | 108/79 |
| 2,941,855 A | 6/1960 | Weill | |
| 3,008,498 A | 11/1961 | Olson | |
| 3,061,055 A | 10/1962 | Nijuis | |
| 3,069,216 A * | 12/1962 | Vaeth | 312/195 |
| 3,139,124 A | 6/1964 | Hoff | |
| 3,387,572 A * | 6/1968 | Ulrich | 108/34 |
| 3,451,183 A | 6/1969 | Lespagnol et al. | |
| 3,463,325 A * | 8/1969 | Rogers et al. | 211/191 |
| 3,513,606 A | 5/1970 | Jones | |
| 3,592,493 A | 7/1971 | Goose | |
| 3,669,479 A | 6/1972 | Payne | |
| 3,734,151 A | 5/1973 | Skripsky | |
| 3,866,496 A | 2/1975 | Payne et al. | |
| 3,901,612 A | 8/1975 | Canin | |
| 4,073,113 A | 2/1978 | Oudot et al. | |
| 4,073,484 A | 2/1978 | Beekenkamp | |
| 4,078,664 A * | 3/1978 | McConnell | 211/189 |
| 4,155,386 A | 5/1979 | Alessio | |
| 4,157,174 A | 6/1979 | Hickman et al. | |
| 4,161,974 A | 7/1979 | Patterson | |
| 4,168,922 A | 9/1979 | Worrallo | |
| 4,265,284 A | 5/1981 | Taylor | |

(Continued)

*Primary Examiner* — Lee D Wilson
*Assistant Examiner* — Jamal Daniel
(74) *Attorney, Agent, or Firm* — Bryan Cave LLP

(57) ABSTRACT

A work table having removably attachable support members extending between opposing frame members and a tool guide retention member extending along at least a portion of the frame. The work table may be collapsible. The tool guide retention member may be defined by a channel extending along at least a portion of the frame member. In turn, tool guides may be attached to the frame using the tool guide retention member. As such, various guides for various operations to be performed on a work piece may be provided. The work piece may be indexed using indexing members or may be clampingly engaged to the work table.

25 Claims, 24 Drawing Sheets

(56) References Cited

U.S. PATENT DOCUMENTS

| | | | | |
|---|---|---|---|---|
| 4,340,318 | A | 7/1982 | Frosch et al. | |
| 4,502,518 | A | 3/1985 | Lewin | |
| 4,566,738 | A | 1/1986 | Fasth | |
| 4,580,776 | A * | 4/1986 | Burkinshaw | 52/7 |
| 4,665,838 | A * | 5/1987 | Minshall | 108/186 |
| 4,877,069 | A | 10/1989 | Plumley | |
| 4,962,799 | A | 10/1990 | Ming-Tang | |
| 4,974,651 | A | 12/1990 | Carmon et al. | |
| 4,995,288 | A | 2/1991 | DellaPolla | |
| 5,055,091 | A | 10/1991 | Morris, Jr. et al. | |
| 5,062,339 | A | 11/1991 | Campos | |
| 5,090,283 | A | 2/1992 | Noble | |
| 5,116,161 | A | 5/1992 | Faisst | |
| 5,144,994 | A | 9/1992 | Stecker, Sr. | |
| 5,165,317 | A | 11/1992 | Findlay | |
| 5,371,988 | A | 12/1994 | Hannes | |
| 5,429,438 | A | 7/1995 | Wood | |
| 5,442,984 | A | 8/1995 | Tate | |
| 5,443,554 | A | 8/1995 | Robert | |
| 5,473,968 | A | 12/1995 | Break et al. | |
| 5,582,088 | A | 12/1996 | Harter | |
| 5,584,254 | A | 12/1996 | Williams | |
| 5,592,981 | A | 1/1997 | Derecktor | |
| 5,628,415 | A * | 5/1997 | Mulholland | 211/189 |
| 5,647,420 | A | 7/1997 | Michell | |
| 5,782,279 | A | 7/1998 | Stecker, Sr. | |
| 5,868,054 | A | 2/1999 | Chubb et al. | |
| 5,884,681 | A | 3/1999 | Nickles | |
| 5,899,132 | A | 5/1999 | Break et al. | |
| 5,901,763 | A | 5/1999 | You | |
| 5,984,294 | A | 11/1999 | Bogomolny | |
| 6,058,990 | A | 5/2000 | Kent | |
| 6,148,881 | A | 11/2000 | Valenzuela | |
| 6,425,558 | B1 * | 7/2002 | Saunders | 248/166 |
| 6,481,177 | B1 | 11/2002 | Wood | |
| 6,659,022 | B1 * | 12/2003 | Holtz | 108/158.12 |
| 6,705,192 | B2 | 3/2004 | Logan | |
| 6,729,075 | B2 * | 5/2004 | Jines et al. | 52/7 |
| 6,748,987 | B2 | 6/2004 | Ayala et al. | |
| 6,854,495 | B2 | 2/2005 | Logan | |
| 7,048,021 | B2 | 5/2006 | Ayala et al. | |
| 7,051,634 | B1 | 5/2006 | Chubb et al. | |
| 7,107,734 | B2 * | 9/2006 | Jines et al. | 52/655.1 |
| 7,316,250 | B1 | 1/2008 | Kent | |
| 7,555,976 | B2 | 7/2009 | Logan et al. | |
| 7,604,027 | B2 | 10/2009 | Thatcher | |
| 7,628,186 | B2 | 12/2009 | Blum | |
| 7,926,397 | B2 | 4/2011 | Logan et al. | |
| 8,016,141 | B2 * | 9/2011 | Konstant | 211/189 |
| 8,167,011 | B2 | 5/2012 | Quiram et al. | |
| 8,302,788 | B2 * | 11/2012 | Vargo et al. | 211/186 |
| 8,316,781 | B1 * | 11/2012 | Majors | 108/158.12 |
| 8,443,992 | B2 * | 5/2013 | Lawson et al. | 211/190 |
| 8,464,493 | B2 | 6/2013 | Boone et al. | |
| 8,671,644 | B2 * | 3/2014 | Huang | 52/653.2 |
| 2002/0122691 | A1 | 9/2002 | Wood | |
| 2003/0155319 | A1 * | 8/2003 | Wishart et al. | 211/189 |
| 2005/0144886 | A1 | 7/2005 | Holawe | |
| 2010/0213658 | A1 | 8/2010 | Huber | |
| 2011/0036956 | A1 | 2/2011 | Miller | |
| 2011/0254213 | A1 | 10/2011 | Logan et al. | |
| 2012/0017809 | A1 * | 1/2012 | Gunn | 108/16 |
| 2012/0169001 | A1 * | 7/2012 | Ducek | 269/290 |
| 2012/0299230 | A1 | 11/2012 | Blick | |
| 2013/0034383 | A1 | 2/2013 | Chong | |

\* cited by examiner

MULTIFUNCTION WORK TABLE

FIELD

The present disclosure generally relates to a multifunction work table. Specifically, the present disclosure relates to a multifunction work table with support members that are removably attachable to a frame of the table and lockably positionable with respect to the frame along a length of the table to support a work piece.

BACKGROUND

Work tables are often used to support a work piece when performing various operations (e.g., cutting, routing, sanding, etc.) on the work piece. Oftentimes, such work tables consist of impromptu supports consisting of little more than a planar sheet of material (e.g., plywood sheets, fiber board sheets, particle board sheets, solid wood sheets, drywall sheets, etc.) supported by saw horses or other such structures. These impromptu work tables may provide improved access to the work piece (e.g., versus performing an operation on the work piece when in place or on the ground) and may provide improved ergonomics for a user performing the operation. As such, operations may be performed on a work piece that is supported by the work table more easily with more consistent results. However, such work tables may not provide the ability to securely hold the work piece. As such, operations performed on the work piece when supported by such work tables may lack precision or accuracy, especially when performing multiple operations on a work piece. In turn, the quality of the finished product may be diminished.

In turn, tool guides have been developed in a number of different forms. For example, miter saws may be used to cut relatively narrow work pieces in a more reliable manner as the work piece may be supported by a table, and the movement of the saw may be controlled to produce relatively precise and accurate cuts. However, miter saws are limited in regard to the width of the work piece. In turn, a miter saw or the like may not be practical to use in order to cut sheet material.

In turn, other types of tool guides have been developed that may be clamped directly to the work piece to guide a tool to perform an operation. In this regard, sheet materials may have operations performed on the sheet in a more reliable manner by using such guides. While these guides may improve the quality of the operation on the work piece, the requirement that the tool guide be clamped to each successive work piece may reduce the repeatability of operations to multiple work pieces. Also, this may require additional time to perform the successive operations on multiple work pieces. Additionally, the act of clamping or otherwise securing the tool guide directly to the work piece may result in damage to the work piece when performing an operation thereon. All these factors may lead to a decrease in accuracy and precision in the final product or an increased cost associated with the goods produced using such tables and guides.

SUMMARY

A first aspect described herein includes a work table. The work table includes a frame including a tool guide retention member that extends along at least a portion the frame. The table also includes a plurality of support members that are removably attachable to longitudinally extending, opposing side members of the frame. The support members extend between the opposing side members. Each of the plurality of support members is lockably positionable along substantially an entire length of the opposing side members. The plurality of supports are adapted to support a work piece in a working plane when attached to the opposing side members along a length thereof.

A number of feature refinements and additional features may be provided with the foregoing aspect. These features may, but need not, be used in any particular combination with any other features or aspects provided herein.

For instance, the work table may also include a tool guide that is engageable with the tool guide retention member so as to secure the tool guide to the frame. Additionally, the work table may have a selectively positionable work piece indexing member attached to the frame. The work piece indexing member may have an extended position and a retracted position. When in the extended position, the work piece indexing member may extend through the working plane. In contrast, when in the retracted position the work piece indexing member may not extend through the working plane.

In one embodiment, the tool guide retention member may include a channel engaged by the tool guide to dispose a tool with respect to the frame. The tool guide may include first and second guide members that are each moveably engageable with the frame. The first guide member and second guide member may engage a tool track so that it is in turn disposed therebetween. The first and second guide members may include posts (e.g., extending through the working plane) that have a narrowed end that is engageable with the tool track to maintain the tool track in a relative position with respect to the work table.

In another embodiment, the tool guide may include a cantilevered tool track extending from a base member that is engaged with the channel to retain the tool guide against the frame. The cantilevered tool track may be disposable in a work position such that the cantilevered tool track extends in a plane substantially parallel to the working plane (e.g., the cantilevered tool track may lay flush against the surface of the work piece). Additionally, the tool guide may include a pivot member to which the cantilevered tool track is attached. The cantilevered tool track may be moveable by the pivot member from the work position to an auxiliary position such that the cantilevered tool track extends away from the work plane.

In another embodiment, at least one support member of the plurality of support members may define a groove extending along at least a portion of the support member. A clamp may be provided that may include an attachment member engageable with the groove and a clamping member operatively connected to the attachment member. The clamping member may be contactable with the work piece to urge the work piece against the at least one support member.

In still another embodiment, the tool guide may include a post member about which the tool is rotatable in a fixed regard with respect to the work piece.

In still a further embodiment, the plurality of support members may include a wooden work piece contact surface such that the support member has a surface adjacent to the working plane that has similar physical properties (e.g., hardness) as the work piece.

A second aspect includes a collapsible work table. The collapsible work table includes a rectangular frame that has a slideable side that is slidingly engaged with a first and a second end member. The sliding side is positionable in a collapsed position and an extended position along the length of the opposing end members. The first and second end members are pivotal with respect to a second stationary side positioned opposite from the slideable side when the slideable side is in the collapsed position. The collapsible table also includes a plurality of support members that are attachable to the frame to extend between the slideable side and the stationary side of the frame when the slideable side is in the extended position. The plurality of support members are adapted to support a work piece in a working plane.

A number of feature refinements and additional features may be provided with the second aspect. These features may, but need not, be used in any particular combination with any other features or aspects provided herein.

In one embodiment, when in the collapsed position, the slideable side may be positioned adjacent to the stationary side. In contrast, when in the extended position, the slideable side may be positioned in a spaced apart fashion from the stationary side member. The slideable side may include hinges at opposing ends of the slideable side. The hinges may be slidingly engageable with channels provided on a respective one of the first and second end members.

In another embodiment, the collapsible table may also include a plurality of base members attached to the stationary side. The base members may be moveable between a stowed position and a deployed position. Accordingly, when in the stowed position, the plurality of base members may be arranged substantially parallel and adjacent to the stationary side. In contrast, when in the deployed position, the plurality of base members may be substantially perpendicular to and extend away from the stationary side member. Also, the collapsible table may include a plurality of projections extending from the slideable side. The projections may be received by respective ones of the plurality of base members when the plurality of base members are in the deployed position. The projections may locate the plurality of base members with respect to the slideable side.

In yet another embodiment, the base members may include a "V" shaped portion. This "V" shaped portion may be adapted to coordinate with a correspondingly shaped recess in a stand upon which the collapsible table may be positioned when then base members are in the deployed position.

A third aspect of the present invention includes an attachment member, which includes a channel attachment member having a channel engagement member thereon. The channel engagement member is slideably disposable in a channel. The attachment member also includes a tool attachment member, which has a tool clamping portion to secure a tool base with respect to the tool attachment member The channel attachment member and the tool attachment member are adjustably positionable to vary a position of the tool attachment member with respect to the channel engagement member.

A number of feature refinements and additional features may be provided with the third aspect. These features may, but need not, be used in any particular combination with any other features or aspects provided herein.

For instance, the channel engagement member may be deflectable with respect to the tool attachment member to secure the attachment member along a length of a channel in which the channel engagement member is disposed. Additionally, the channel attachment member and the tool attachment member are adjustably positionable in a vertical dimension with respect to a work piece.

DETAILED DESCRIPTION

Figure 1:
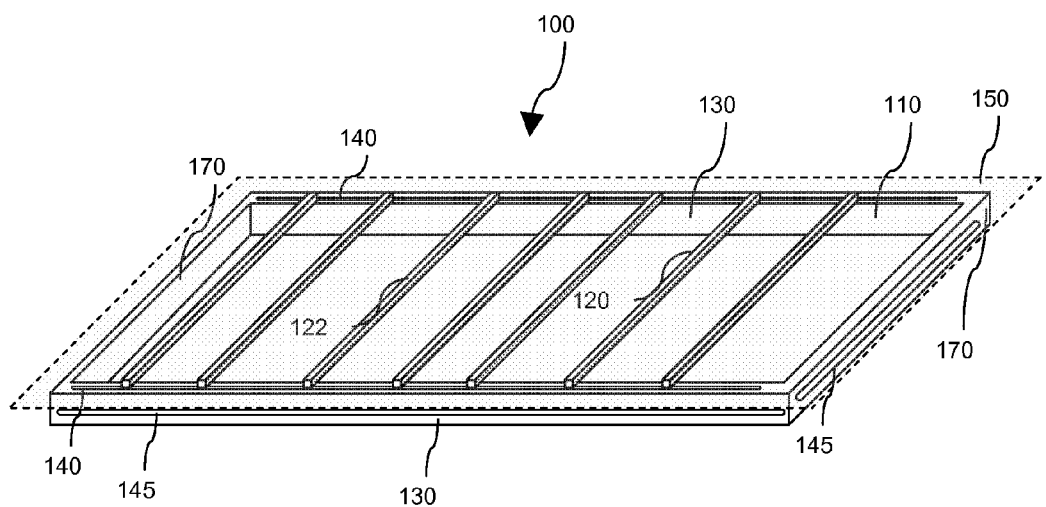
FIG. 1 is a perspective view of an embodiment of a work table.

While the invention is susceptible to various modifications and alternative forms, specific embodiments thereof have been shown by way of example in the drawings and are described in detail herein. It should be understood, however, that it is not intended to limit the invention to the particular form disclosed, but rather, the invention is to cover all modifications, equivalents, and alternatives falling within the scope of the invention as defined by the claims.

The following disclosure begins by generally describing an embodiment of a work table that includes one or more support members that may be removably attachable to a frame of the work table. One embodiment of a support member having a locking mechanism to lockably attach a support member to a frame is also described. Additionally, an embodiment of a collapsible work table is described that may similarly be engaged by one or more support members. Also, a number of different embodiments of a tool guide are shown and described that may be used with a tool to perform various operations with respect to a work piece positioned on the work table. Any of the tool guides described herein may be used in any combination and with any embodiment of a table described herein or with other equivalent table embodiments.

FIG. 1 depicts an embodiment of a work table 100. The table 100 includes a frame 110 that defines a perimeter of the table 100. The table 100 may have a generally rectangular shape, although other shapes (e.g. a triangular shape, a pentagonal shape, etc.) could also be provided. Furthermore, in another embodiment, the table 100 may be square. The frame 100 may, in one embodiment, be constructed from extruded aluminum so as to define channels, grooves or other features in the frame 110. These channel or grooves may be provided on any or all faces of the members of the frame 110, even though not shown as such in FIG. 1. These grooves, channels, or other features may extend along an entire length of the respective sides and/or ends of the frame 110. Additionally or alternatively, these grooves, channels, and the like may extend partially along the same. Other materials may be used to construct the frame such as, without limitation, wood, steel, a polymer, or some other suitable material. The table 100 may be supported by any appropriate means. For instance, the table 100 may be disposed on top of saw horses (not shown) to elevate and support the table 100.

The frame 110 may include opposing longitudinally extending sides 130. Also, laterally extending end members 170 may extend between the longitudinally extending sides 130 at opposing ends of the frame 110. One or both of the longitudinally extending sides 130 and/or one or both of the longitudinally extending end members 170 may include a tool guide retention member 145. The tool guide retention member 145 may be defined as a channel extending along at least a portion of the frame 110. The tool guide retention member 145 may engage one or more tool guides in a manner as discussed in greater detail below.

The table 100 may also include a plurality of support members 120 extending between the opposing longitudinally extending sides 130. The support members 120 may be removably attached to the frame 110. The support members 120 may also be lockably positionable along the length of the longitudinally extending sides 130. For instance, the support members 120 may have tabs at each end of the support member 120 that each engage a support member attachment channel 140 provided in a respective one of the longitudinally extending sides 130 of the frame 110. Thus, the location of the support members 120 may be infinitely adjustable along the length of the sides 130 where the channel 140 is provided. In turn, a user may arbitrarily position the support members 120 where desired and is not limited to discrete positions for the support members 120. The support members 120 may have a locking mechanism used to secure the support members 120 to the frame 110, an embodiment of which will be discussed in greater detail below.

Top surfaces 122 of the support members 120 may coordinate to support a work piece above the table 100. The top surfaces 122 of the support members 120 may all lie in or adjacent to a common working plane 150, in which the work piece (not shown in FIG. 1) is disposed when supported by the table 100. That is, the working plane 150 may define a plane extending along an interface of a work piece and the support members 120. The support members 120 may include a portion adjacent to the working plane 150 that may be constructed of a material having similar physical properties as the work piece. That is, the portion may have similar characteristics (e.g., hardness) as the work piece. Thus, in the event the portion of the support member 120 adjacent to the work plane 150 is contacted by a tool, damage to the tool may be avoided. Also, damage to the work piece (e.g., scratching, scuffing, etc.) caused by a harder material contacting the work piece may be avoided Once such a portion of the support member 120 has been sufficiently damaged or degraded, the portion of the support members 120 may be replaced or resurfaced with minimal effort and cost.

Figure 2:
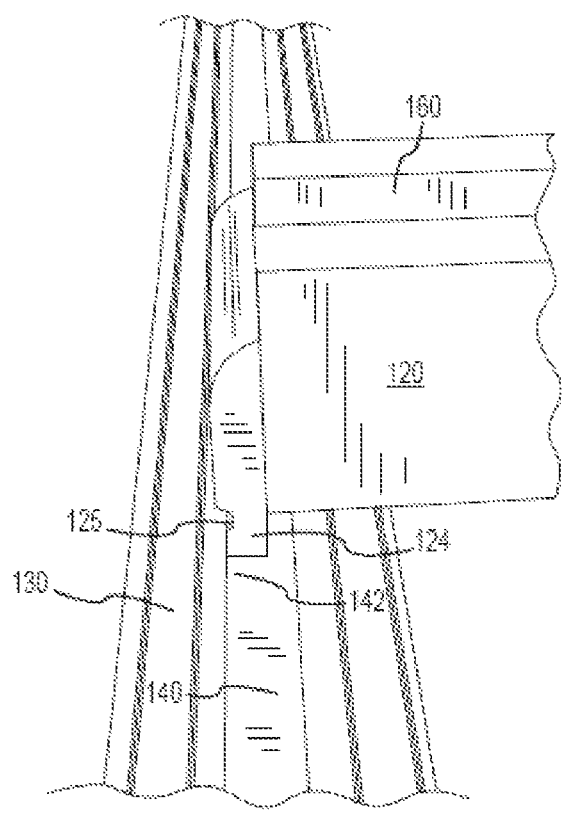
FIG. 2 is a perspective view of one end of a support member.
Figure 3:
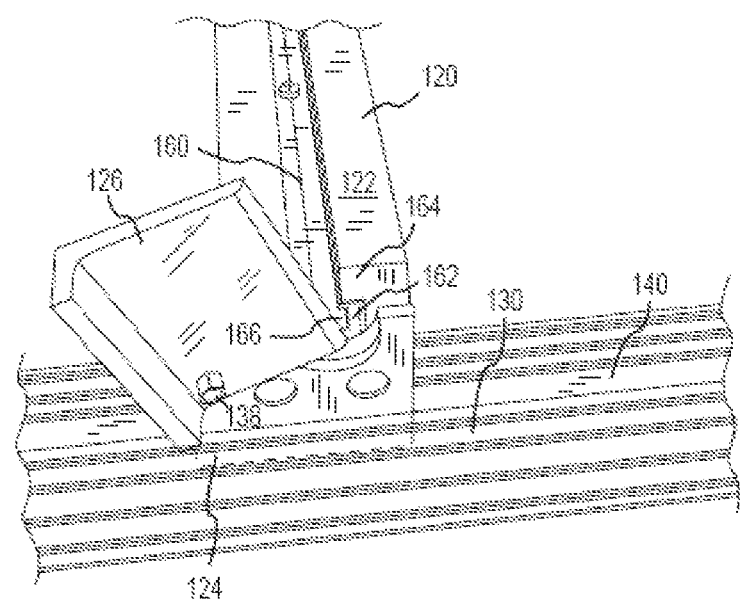
FIG. 3 is a perspective view of the other end of the support member shown in FIG. 2.

FIGS. 2 and 3 depict one embodiment of a locking mechanism that may be used to secure a support member 120 to a frame 110. The support member 120 may include a locking mechanism that may coordinate with a support member attachment channel 140 to lockably position a support member 120 to the frame 110. As shown in FIG. 2, a first end of the support member 120 may be positioned such that a tab 124 is disposable within a channel 140 in a longitudinally extending side member 130. The tab 124 may include a contour 125 that corresponds to the channel 140 so as to fit with a lip 142 of the channel 140. Alternatively, this first end of the support member 120 may include a locking mechanism as shown and described in FIG. 3.

An opposite end of the support member 120 is shown in FIG. 3. A tab 124 on this end of the support member 120 may be disposed in a support member attachment channel 140 of the longitudinally extending side member 130. A locking wedge 126 may be provided on this end of the support member 120. The locking wedge 126 may have a generally tapered body and may pivot about a pin 138. As such, the locking wedge 126 may be pivoted about the pin 138 such that a narrow end of the locking wedge 126 is disposed into the channel 140 adjacent to the tab 124. Upon advancement of the locking wedge 126 into the channel 140, the locking wedge 126 and tab 124 may act upon the channel 140 to lock the support member 120 in place along the channel 140.

Also depicted in FIGS. 2 and 3 is a groove 160, which is defined in the support member 120. The groove 160 may have a sleeve 162 fitted therein. The sleeve 162 may provide additional support to the groove 160. As shown, the groove 160 may include opposing projections 164 that define a shoulder 166. As such, a clamp may be provided that coordinates with the groove 160 to impart a clamping force on the shoulder 166 and a work piece (not shown) to hold a work piece against the support member 120 as will be described in more detail below.

The locking wedge 124 may not interfere with the end of the channel 160 when the locking wedge 124 is disposed into the channel 140 to lock the support member 120 to the to the side member 130. In this regard, a top surface of the locking wedge 124 may be disposed below the level of the channel 160 such that access to the channel 160 at the end of the support member 120 adjacent to the locking wedge 126 is maintained. Alternatively or additionally, the locking wedge 126 may include a correspondingly shaped notch or other recess that allows the channel 160 to be accessed without interference from the locking wedge 126 when in the locked position.

FIGS. 4A-4D depict a number of embodiments of a support members designated as 120A, 120B, 120C, and 120D. For example, in FIG. 4A a support member 120A is shown. The support member 120A may include a support member body 400 in which a channel 160 is defined. The channel 160 may include a projecting shoulder 166 which contains a sleeve 162 fitted in the channel 160. The sleeve 162 may be attached to the support member body 400 by way of a fastener 422. The top surface 122 of the support member 120A may be made of a similar material as the work piece. The sleeve 162 may be constructed from, for example, aluminum, steel, polymer, wood, or another appropriate material.

Figure 4A:
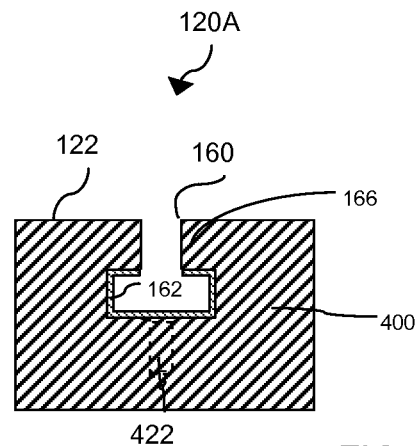
FIGS. 4A-4D are cross sectional views of various embodiments of a support member.
Figure 4B:
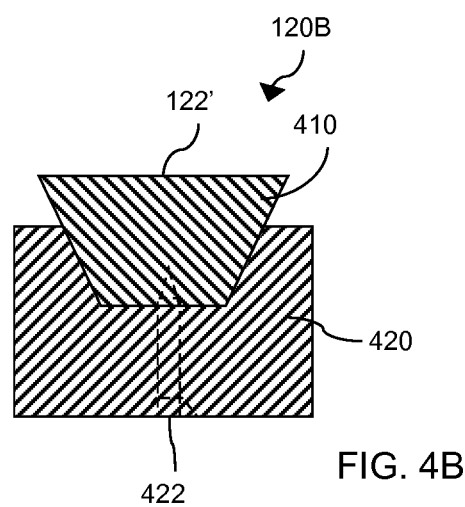

In FIG. 4B, a support member 120B is shown. The support member 120B includes a replaceable portion 410. The replaceable portion 410 may include a continuous top surface 122'. As such, a support member 120B may not include a channel. The replaceable portion 410 may be constructed of a material with similar properties as the work piece as discussed above. The replaceable portion 410 may be removably attached to a support member base 420. As such, a fastener 422 may be provided to selectively attach the removable portion 410 to the support member base 420. The fastener 422 may be a screw, bolt, nail, or other appropriate type of fastener. Other arrangements may be provided to facilitate removal and attachment of the removable portion 410 from the support member base 420 (e.g. through coordinating projections and slots, hook and loop fasteners, or other mechanisms for removably attaching the two members).

Figure 4C:
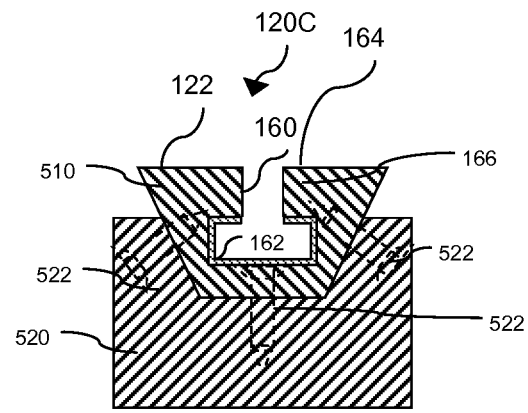

FIG. 4C depicts a cross section of an alternate embodiment of a support member 120C. The support member 120C includes a removable portion 510 that defines a groove 160 in the support member 120C. The groove 160 of the support member 120C may also have a sleeve 162 fitted therein to provide additional structural rigidity to opposing projections 164 that define a shoulder 166. The removable portion 510 may be removably attachable to a support member base 520 (e.g., by way of a fastener 522).

Figure 4D:
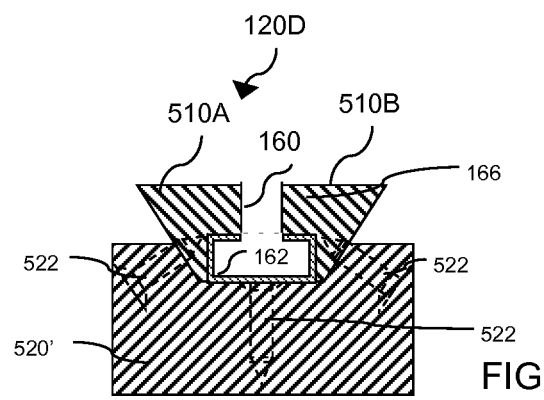

FIG. 4D depicts another embodiment of support member 120D. The support member 120D may include a base member 520' to which a sleeve 162 is attached by way of a fastener 522. A first removable portion 510A and a second removable portion 510B may be secured to the support member base 520' by way of fasteners 522. In this regard, the first and second removable portions 510A and 510B may each include a shoulder portion 166 that in turn defines a channel 160.

Figure 5A:
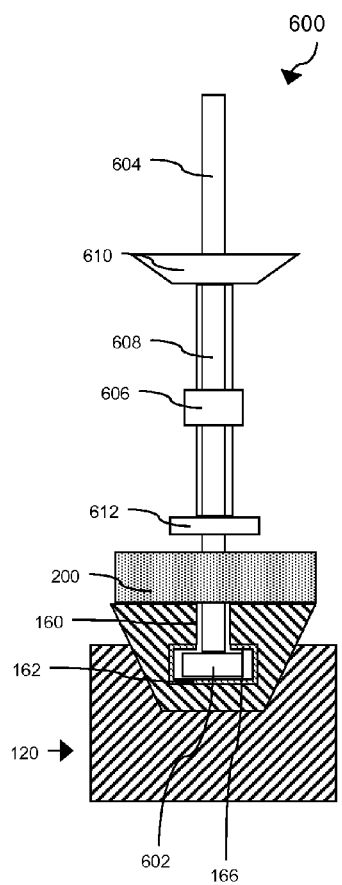
FIG. 5A is a side view of one embodiment of a clamp engaged with a support member to clampingly engage a work piece to the support member.
Figure 5B:
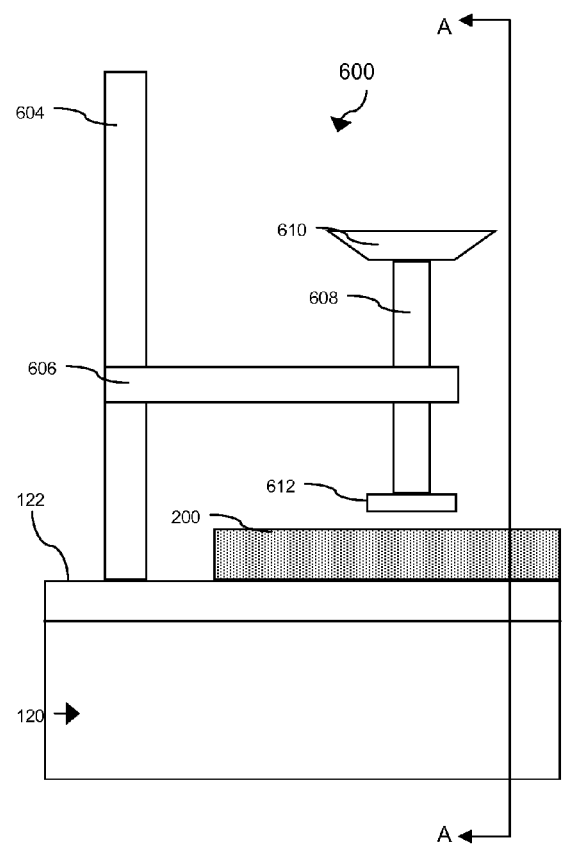
FIG. 5B is a cross sectional view taken along section line A-A in FIG. 5A.

With additional reference to FIGS. 5A and 5B, a support member 120 that includes a groove 160 may receive a clamp 600 to clamp a work piece 200 against the support member 120. A clamp 600 may have an attachment portion 602 adapted to fit in the groove 160 that engages engage a shoulder 166 of the groove 160. The attachment portion 602 may be attached to a clamp mast 604 extending from the attachment portion 602 which extends away from the support member 120. The mast 604 may be narrower than the attachment portion 602 so as to pass through the narrowest portion of the groove 160 (i.e., the opening between the shoulders 166). The mast 604 may engage a clamp arm 606. The clamp arm 606 may be positioned along the mast 604 by way of friction, a ratchet, or other suitable mechanism. The clamp arm 606 may support a shank 608. The shank 608 may be threadably engaged with the clamp arm 606 such that the shank 608 may be advanced or retracted with respect to the work piece 200.

Accordingly, a handle 610 may be provided on an end of the shank 608. The handle 610 may allow a user to selectively advance and/or retract the shank 608 with respect to the work piece 200. A clamping pad 612 may be provided at the opposite end of the shank 608. The clamping pad 612 may be constructed of an appropriate material (e.g., one softer than the work piece 200) so as reduce the likelihood of damage (e.g., a scratch, a scuff, etc.) to the work piece 200. Additionally, the clamping pad 612 may distribute the clamping force applied to the work piece 200 to further reduce the likelihood of damage to the work piece 200.

As such, the clamp 600 may be positioned such that the attachment member 602 is disposed within the groove 160 as shown best in FIG. 5A. The arm 606 may be lowered such that the clamping pad 612 contacts the work piece 200. The shank 608 may be threadably advanced toward the work piece 200 by rotation of the handle 610. As such, the force applied by the clamping pad 612 may be countered by engagement of the attachment member 602 with the shoulders 166 of the groove 160. In turn, the work piece 200 may be clamped to the support member 120. Other appropriate types of clamps may be provided including other styles of clamps that may coordinate with the groove 600 (e.g., ratchet-type quick release clamps etc.). Further still, clamps may be employed that engage a bottom surface of the support member 120 to clamp a work piece 200 to the top of the support member 120 (e.g., in the case of a support member lacking a groove).

Figure 6:
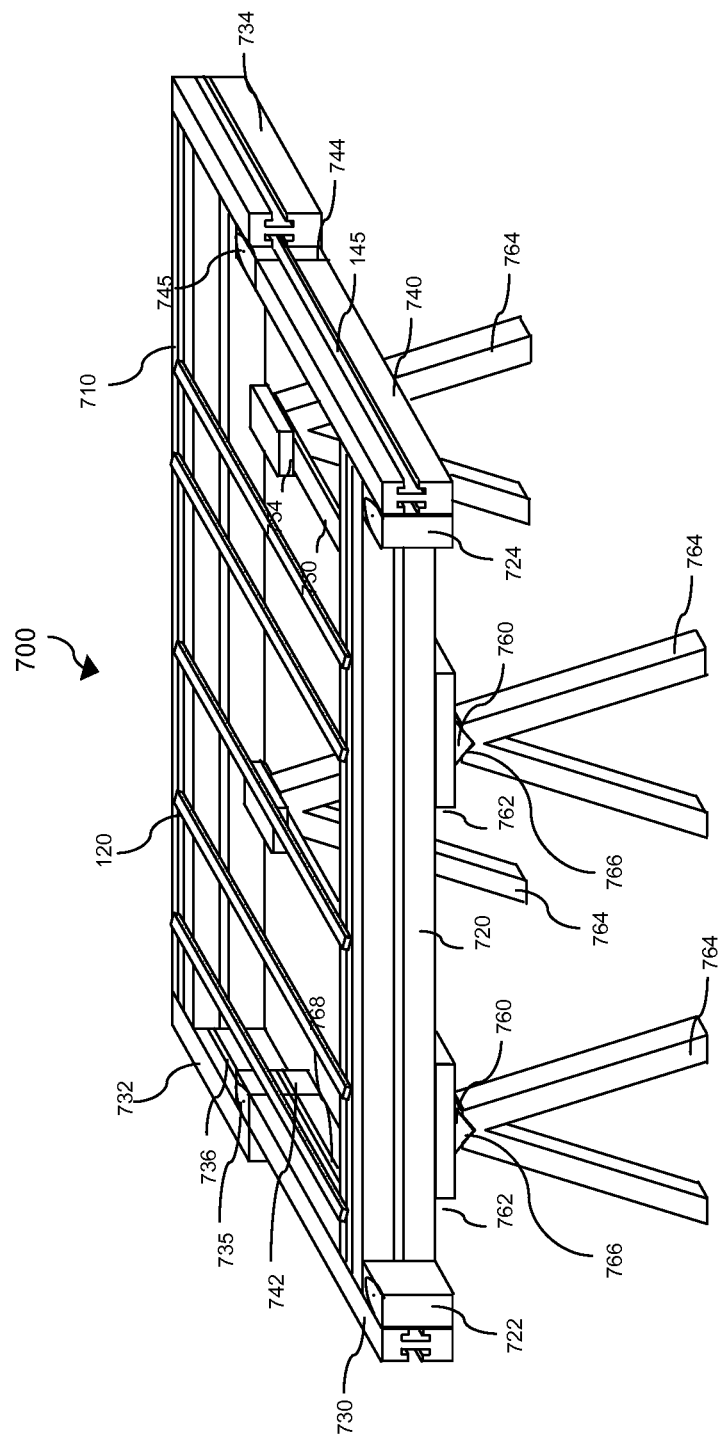
FIG. 6 is a perspective view of another embodiment of a work table.
Figure 7:
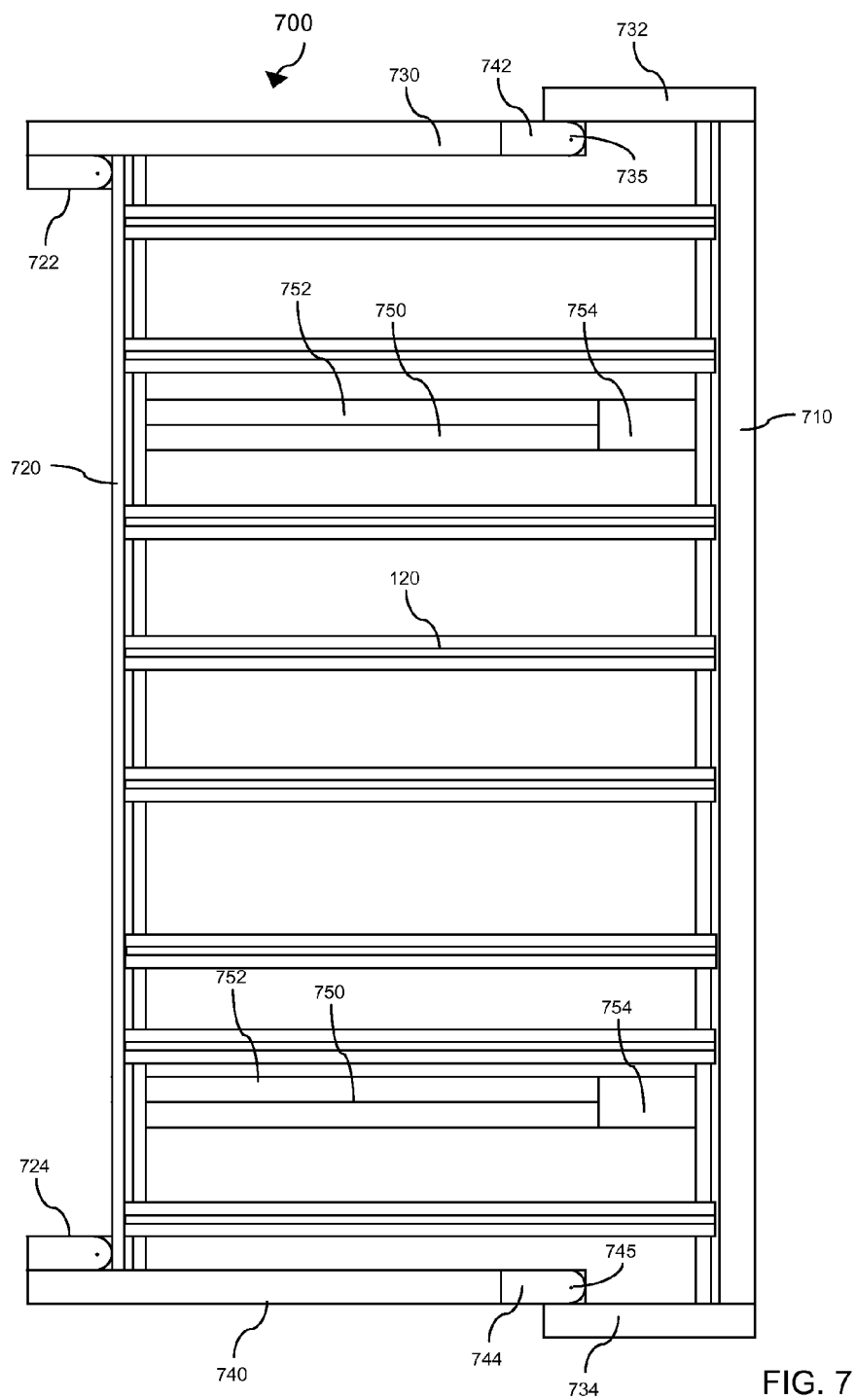
FIG. 7 is a top view of the embodiment shown in FIG. 6.

FIG. 6 depicts another embodiment of a multifunction table 700. A top view of the table is shown in FIG. 7. The table 700 may be collapsible such that, for instance, the table 700 may be more easily transported or stored. The table 700 may include a stationary side member 710. Extension members 732 and 734 may be provided on opposing ends of the stationary side member 710. The extension members 732 and 734 may be attached to the stationary side member 710, for instance, using bolts, welding, or any other appropriate joining technique. The extension members 732 and 734 may extend perpendicularly with respect to the stationary side member 710. The extension members 732 and 734 may define a slot 736 (shown in FIG. 6) extending along substantially all of an interior face of the extension members 732 and 734.

A first hinge 742 may be attached to the extension member 732 by engagement of the first hinge 742 with the slot 736 provided on an interior face of the extension member 732. The first hinge 742 may be slideably moveable along the interior face of the extension member 732. Additionally, the first hinge 742 may include a pivot 735 that slides along with the remainder of the first hinge 742. As such, the hinge 742 may be slideable along the extension member 732 and may facilitate pivotal movement about the pivot 735. The hinge 742 may be attached to or provided integrally with a first folding end member 730. In a like regard, a second hinge 744 may be slideably moveable along an interior face of the extension member 734. The second hinge 744 may facilitate pivotal movement about a pivot 745 such that an attached second folding end member 740 is slideably moveable and pivotally moveable with respect to the extension member 734 and pivot 745, respectively.

A sliding side member 720 may be provided opposite from and parallel to the stationary side member 710. The sliding side member 720 may have a third hinge 722 and a fourth hinge 724 at opposite ends of the sliding side member 720. The third and fourth hinges 722 and 724, in addition to being attached to the sliding side member 720, may slide along a length of the first and second folding end members 730 and 740 as will be discussed in greater detail below.

Figure 9:
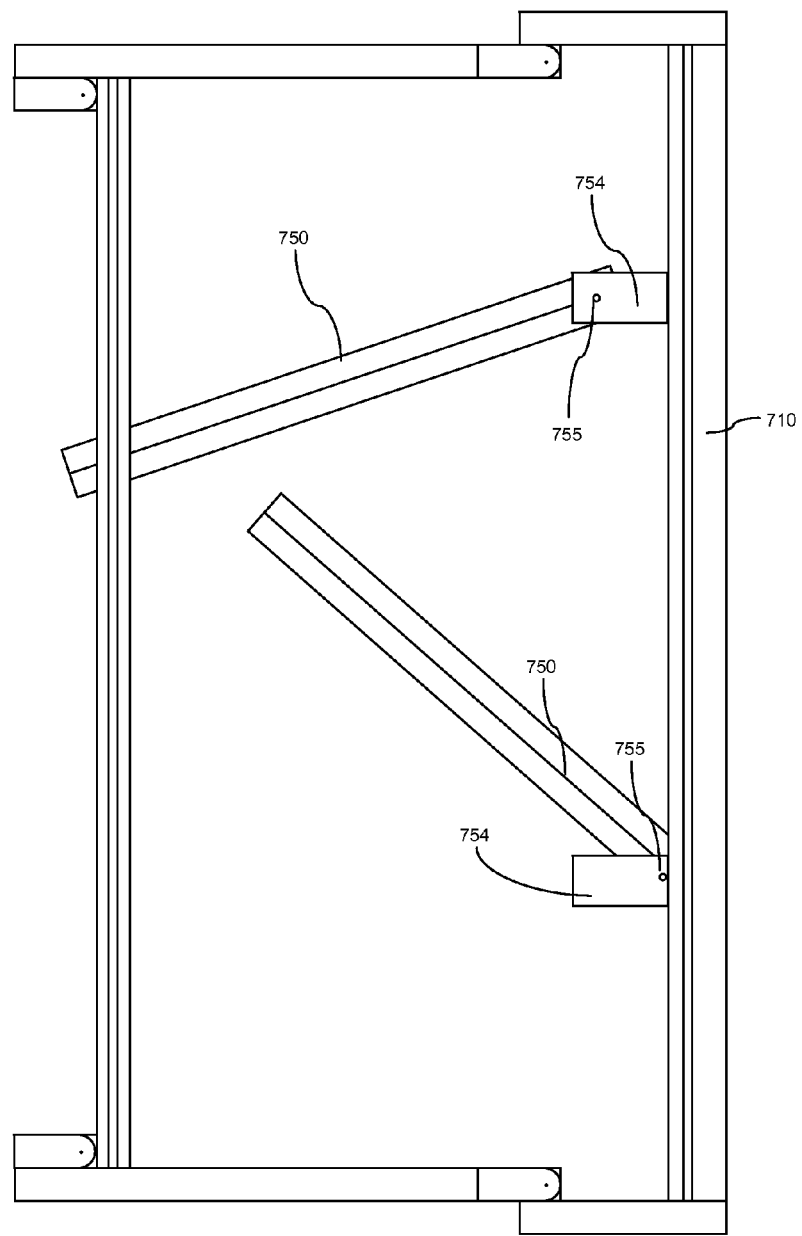
FIGS. 9-11 are top views showing a progression of the embodiment shown in FIG. 7 from an extended position to a collapsed position.
Figure 10:
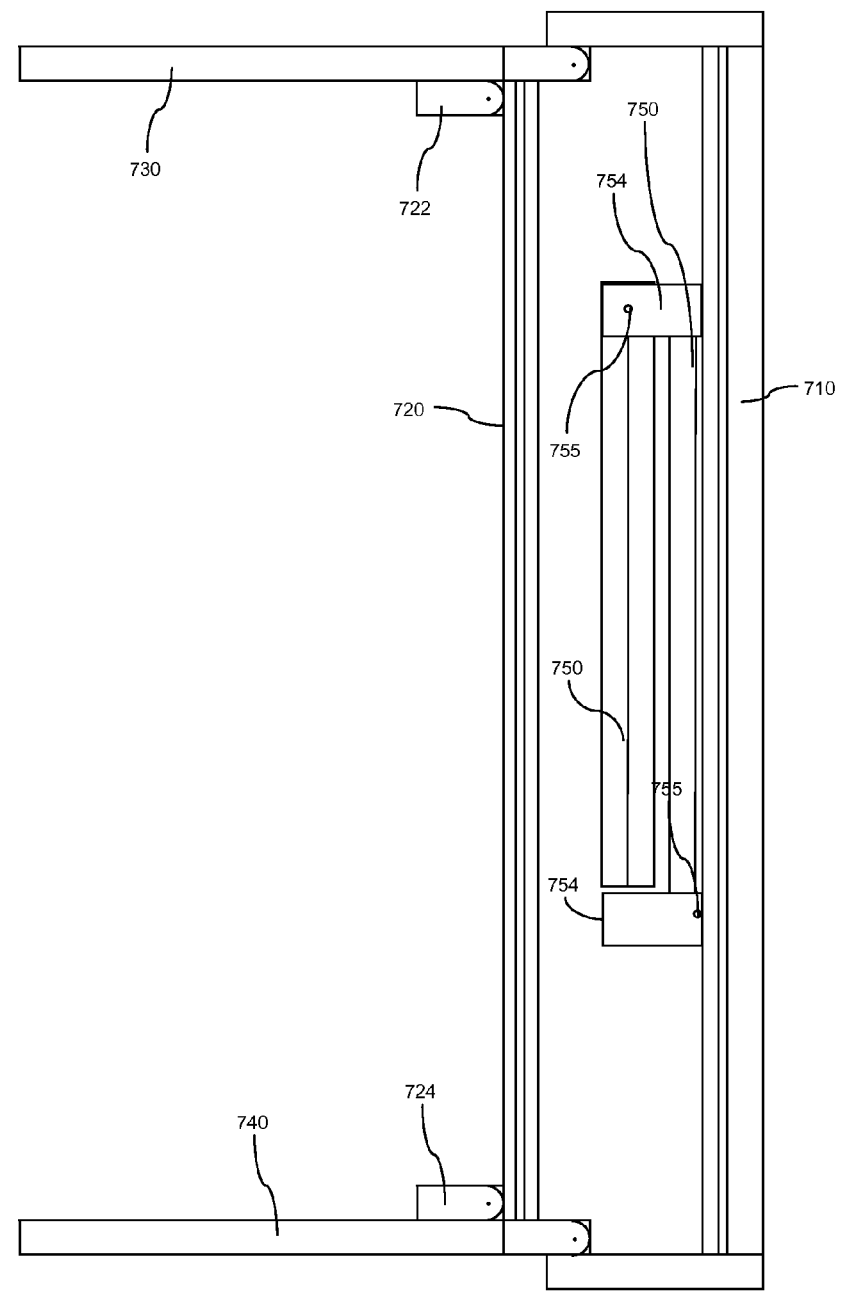

Additionally, the stationary side member 710 may have attached thereto at least two base members 750. The base members 750 may be moveably attached to an attachment portion 754, which is provided on the stationary side member 710. The base members 750 may be moveable between a stowed position and a deployed position. When in the deployed position, the base members 750 span substantially the entire width of the table 700 so as to be disposed adjacent to the slideable side member 720 in the expanded position (as shown in FIGS. 6 and 7). The base member 750, for instance, may be rotatable with respect to the attachment portions 754 at pivots 755 such that they may be rotated from the deployed position shown in FIG. 7 to a stowed position. FIG. 9 shows the base members 750 in an intermediate position between the deployed position and stowed position. In FIG. 10, the base members 750 are in the stowed position. In this regard, the base members 750 may be parallel and adjacent to the stationary side member 710 in the stowed position. As the pivots 755 are offset with respect to the attachment members 754, the base members 750 may be arranged as shown in FIG. 10 such that the base members 750 are parallel and adjacent to each other when in the stowed position.

Figure 8:
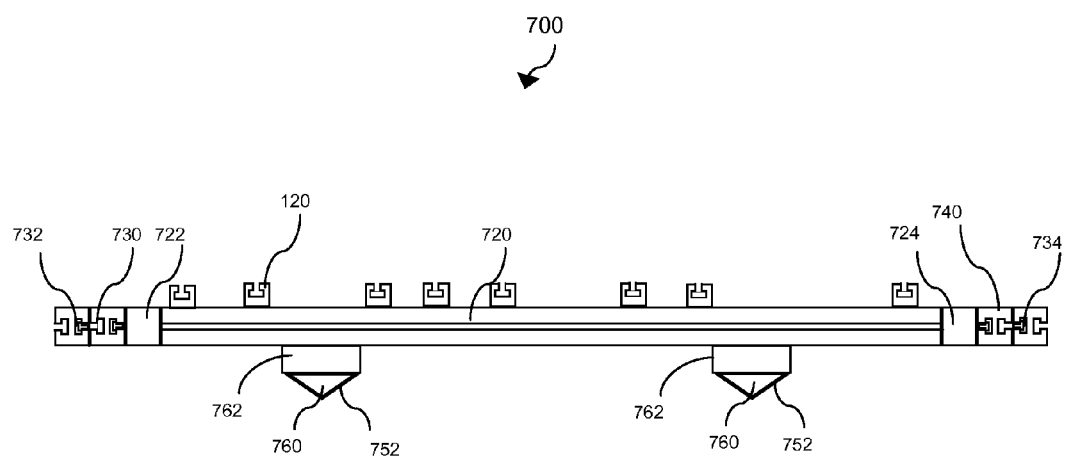
FIG. 8 is a side view of the embodiment shown in FIG. 7.

With additional reference to FIG. 8, a side view of the table 700 is shown. A generally "V" shaped portion 752 may also be provided on the base members 750. As shown in FIG. 8, the "V" shaped portion 752 may coordinate with correspondingly shaped projection 760 operatively attached to the sliding side member 720. The "V" shaped portion 752 may be correspondingly shaped to receive the projection 760. The projection 760 may be adjustably moveable along the length of the slideable side member 720. For instance, the projection 760 may be provided with a sliding attachment 762 that coordinates with a slot provided on the underside of the sliding side member 720.

As such, the "V" shaped portion 752 may receive the projection 760 to provide a suitably stable platform for the table 700 when resting upon one or more supports to support the table 700. For example, one or more saw horses 764 or other structures with a correspondingly shaped depression 766 may receive the "V" shaped channel 752 of the base members 750. The nature of the "V" shaped channels 752 may help reduce the potential the table 700 would slide with respect to the saw horses 764. This may be because sliding forces that would otherwise cause the table 700 to move or slide with respect to the saw horse 764 would require an additional uplifting force to unseat the "V" shaped portion 752 from the correspondingly shaped depression 766 on the saw horses 764. Furthermore, while the foregoing describes a "V" shaped portion 752, this particular arrangement is shown for demonstrative purposes such that any arbitrary matching shape for the base member 750 and correspondingly shaped depression 166 of the supporting structure may be used.

Figure 11:
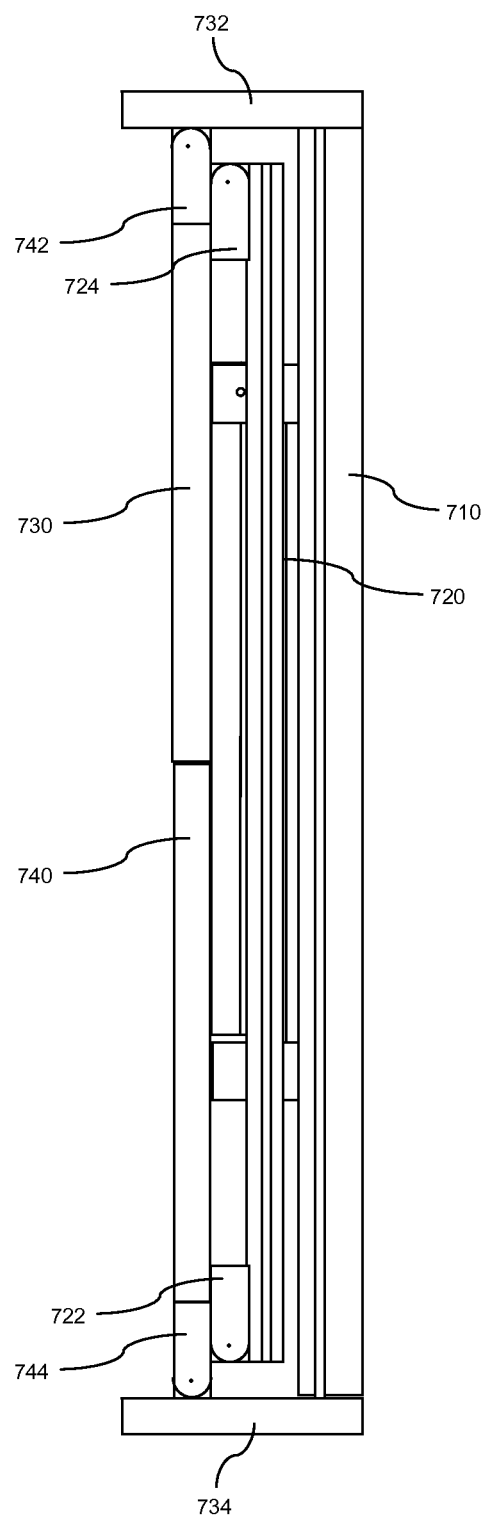

As shown in FIG. 9, and referenced above, the base members 750 may be rotated with respect to the attachment portion 754. As such, the base members 750 may be pivoted such that they are substantially parallel with the static side member 710 as depicted in FIG. 10 when in the stowed position. Also in FIG. 10, the slideable side member 720 has been moved along with the third and fourth hinges 722 and 724 toward the stationary side member 710. As such, the slideable side member 720 may be moved between an extended position (shown in FIG. 7) and a collapsed position (shown in FIG. 10). The slideable side member 720 may be spaced apart from the stationary side member 710 in the extended position and adjacent to the stationary side member 710 in the collapsed position. This may be facilitated as the first and second hinges 722 and 724 may slideably engage a slot 768 (shown in FIG. 6) on an interior face of the first and second folding end members 730 and 740. In this regard, the first and second folding end members 730 and 740 may be pivoted to a folded position as shown in FIG. 11. Thus, the table 700 may be collapsed for eased transport or storage.

Figure 23:
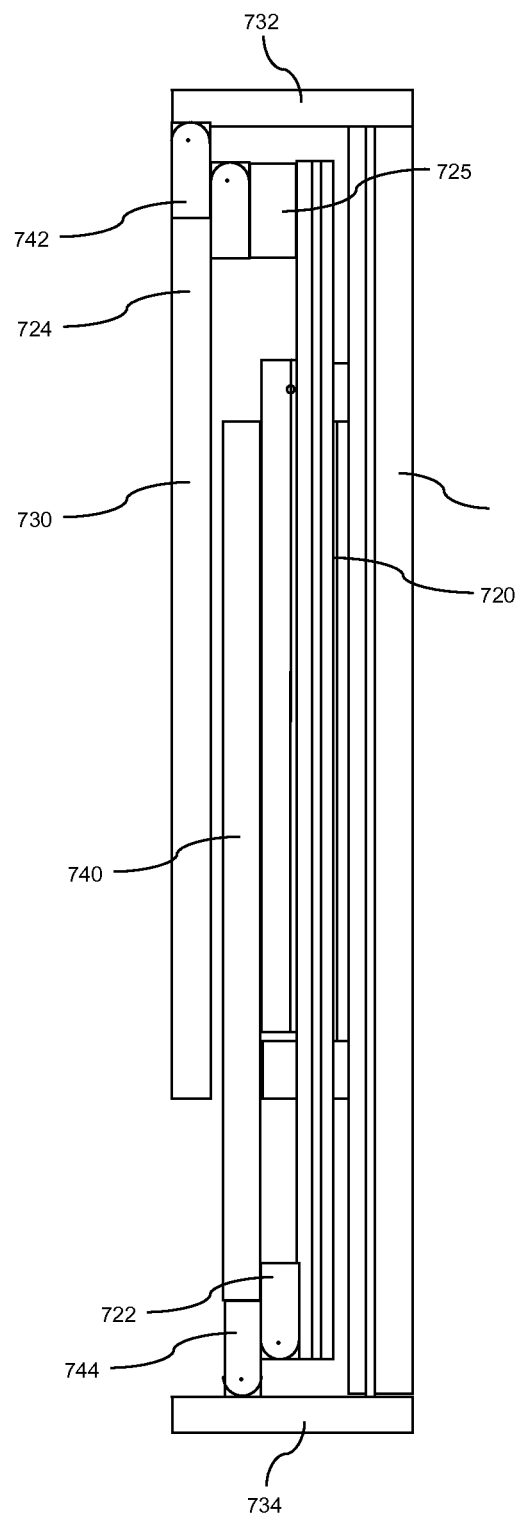
FIG. 23 is a top view of an alternate embodiment of a table in a folded position.

While not shown in FIG. 11, the folding end members 730 and 740 may partially overlap rather than abut one another when in the folded position as shown in FIG. 23. Accordingly, the folding end members 730 and 740 may be offset along a length of the extension members 732 and 734 when in the folded position. To accommodate an offset between the folding end members 732 and 734, a spacer 725 may be provided on one of the hinges 722 or 724. For instance, as shown in FIG. 23, the spacer 725 may be provided at hinge 724. Alternatively, alternate hinge designs may be employed that allow the sliding side member 720 span between the offset folding end members 732 and 734 without the use of a spacer 725. In this regard, differently sized tables (e.g., a square table) that include folding end members 730 and 740 that have lengths representing a larger portion of the stationary side member 710 may be provided that still allow the folding end members to be moved to a folded position (e.g., as shown in FIG. 23).

With additional reference to FIGS. 12-15, an embodiment of a tool guide member 202 is shown as may be used in conjunction with the collapsible work table 700. However, the tool guides disclosed herein may also be used with other embodiments of a table. The tool guide member 202 may generally include two posts 212 supported by corresponding attachment members 210. The attachment members 210 may be slideably engaged with a respective tool guide retention member 145 provided in the first and second folding end members 730 and 740.

Figure 12:
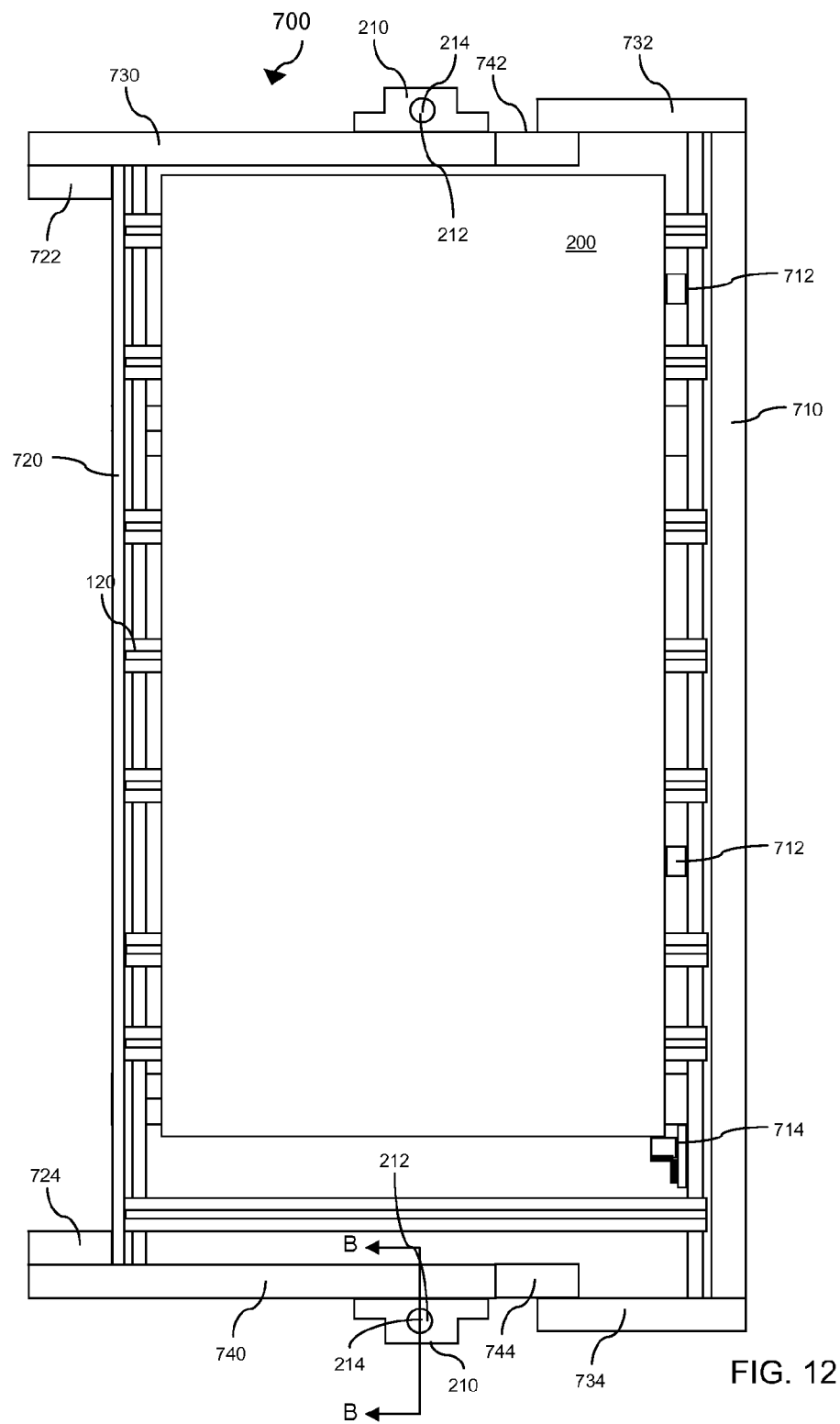
FIG. 12 is a top view of the embodiment shown in FIG. 7, wherein a work piece is indexed with respect to the table and attachment members of an embodiment of a tool guide are attached to opposite ends of the table.
Figure 13:
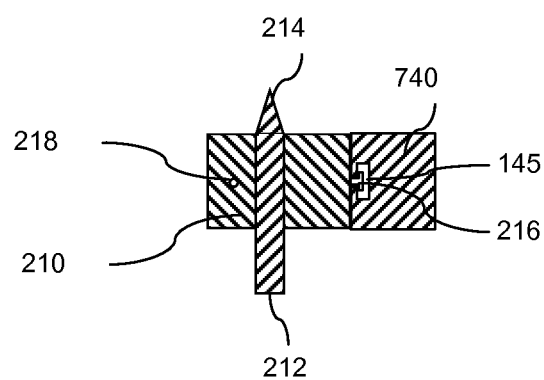
FIG. 13 shows a cross sectional view of the portion of the tool guide shown in FIG. 12 taken along section line B-B.

For instance, FIG. 13 is a cross section view taken along section line B-B in FIG. 12. The second folding end member 740 may define a tool guide retention member 145. The shoulder of an attachment bolt 216 may be disposed within the tool guide retention member 145. A fastener, such as an adjustable handle, nut, or the like, may be engaged with the attachment bolt 216 to tighten the attachment bolt 216 with respect to the tool guide retention member 145 to secure the attachment member 210 to the folding end member 740. One or more attachment bolts 216 may be provided.

The post 212 may be attached to the attachment members 210 such that the height of the post 212 may be adjusted depending on the thickness of the work piece 200. As such, the post 212 may be engaged by a clamping action of the attachment member 210 (e.g., by way of a set screw 218 or the like). A narrowed end 214 of the post 212 may include a point, a ridge, or other narrowed shape (e.g., a frustoconical shape) at one end of the post 212.

Figure 14:
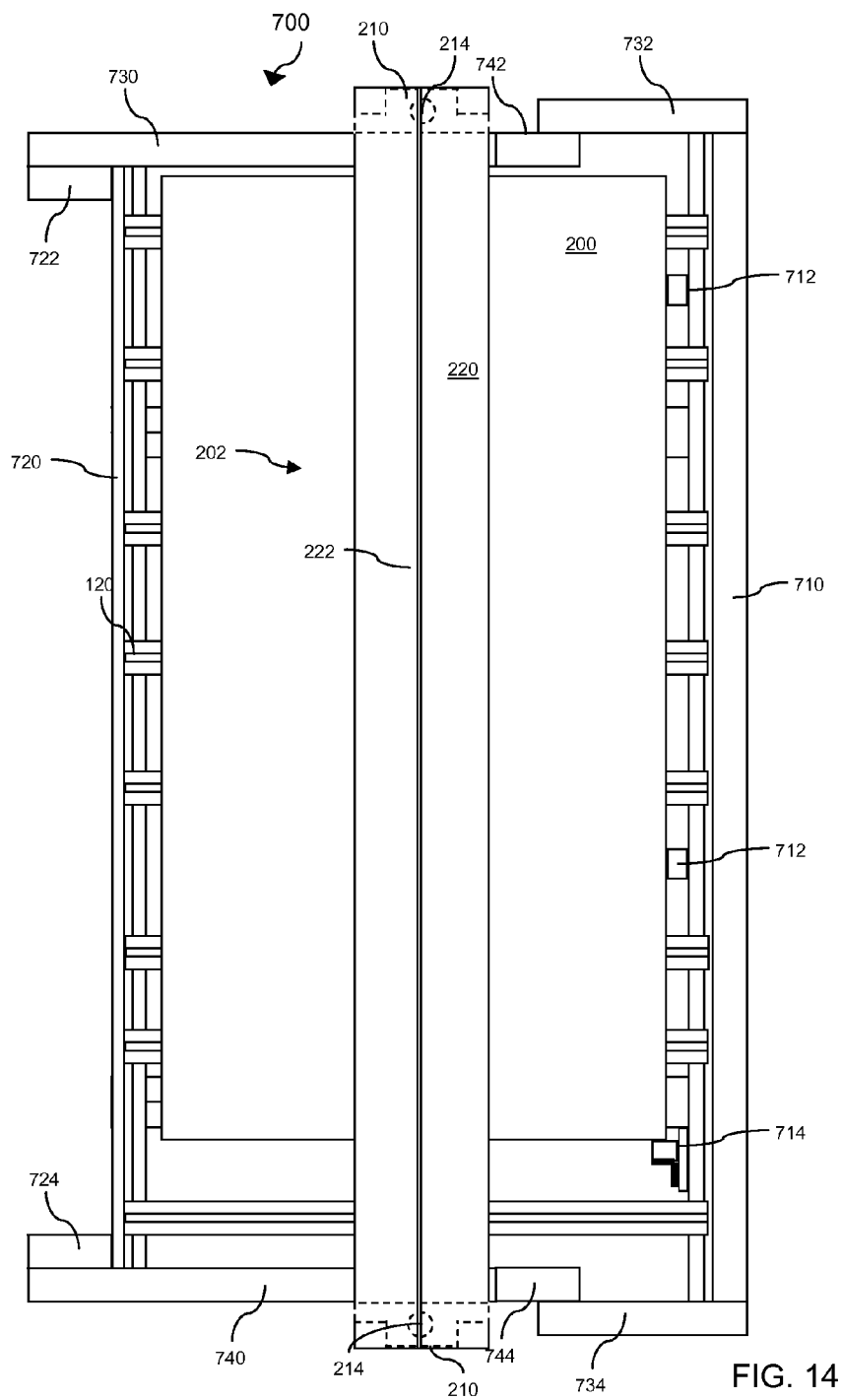
FIG. 14 is a top view of the embodiment shown in FIG. 12 with the tool guide in place.
Figure 15:
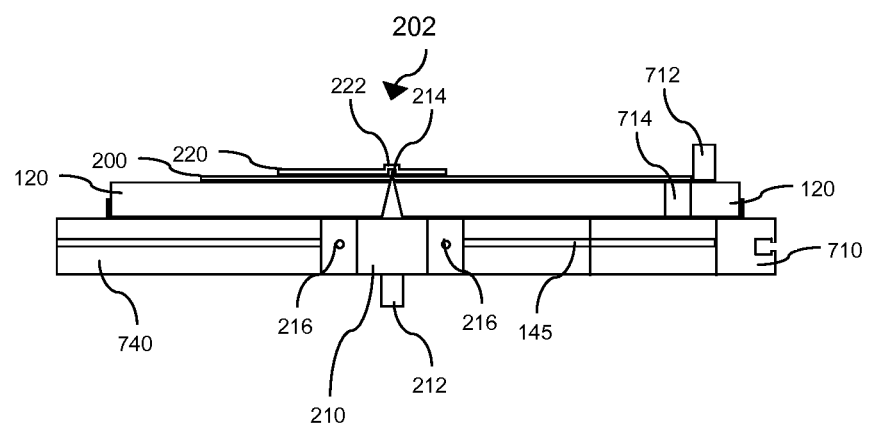
FIG. 15 is an end view of the embodiment shown in FIG. 14.

The narrowed end 214 of a respective one of the posts 212 may engage a tool guide track 220 (as shown in FIGS. 14 and 15). For instance, a crease 222 may be provided on the tool guide track 220 such that the narrowed ends 214 engage the underside of the crease 222 to locate the tool guide track 220 with respect to the work piece 200. This may prevent the tool guide track from moving laterally with respect to the work piece 200. The crease 222 may also project on the top side of the tool guide track 220. A corresponding tool base may be provided that engages the crease 222 on the top side of the tool track 220 to guide a tool (not shown) along the length of the tool guide track 220. Thus, the tool may be guided along the tool track 220 with respect to the work piece 200 to perform an operation (e.g., a cutting operation, a routing operation, etc.) on the work piece 200.

The work piece 200 may be indexed on the table 700 with one or more lateral indexing members 712 and one or more longitudinal index members 714. As such, the work piece 200 may be positioned in a known relative location with respect to the table 700. The lateral index members 712 may comprise a stanchion that projects through a working plane defined by the top surfaces 122 of the support members 120. The lateral index members 712 may be arranged on the stationary side member 710 such that the work piece 200 may be abutted against the lateral index members 712 when the lateral index members 712 are arranged so as to extend through the work plane. Thus, the work piece 200 may be indexed laterally with respect to the stationary side member 710 (e.g., to be substantially parallel thereto).

The longitudinal index member 714 may also be attached to the stationary side member 710. The longitudinal index member 714 may extend laterally beyond the lateral index members 712, such that a longitudinal end of the work piece 200 may be abutted against the longitudinal index member 714. As such, the work piece may be indexed against a known position of the longitudinal index member 714 as well.

The lateral index members 712 may be rotatable such that the lateral index members 712 are rotatable into a position such that they do not project through the work plane 150. For instance, the lateral index members 712 may engage a slot on an interior face of the stationary side 710. As such, an attachment bolt may secure the lateral index members 712 to the stationary side 710. As the attachment bolt is loosened, the lateral index members 712 may be rotated about the attachment bolt between an extended and retracted position. As such, the lateral index members 712 may be provided in a retracted position when not in use such that the work piece 200 may be supported on the table 700 in any manner without contacting the lateral indexing members 712. Also, the lateral index members 712 may be adjustably rotated when in an extended position such that the portion of the lateral index members 712 extending beyond the work plane 150 may be adjusted. Thus, the height of the lateral index members 712 may be adjusted to accommodate work pieces 200 of various thicknesses.

Figure 22A:
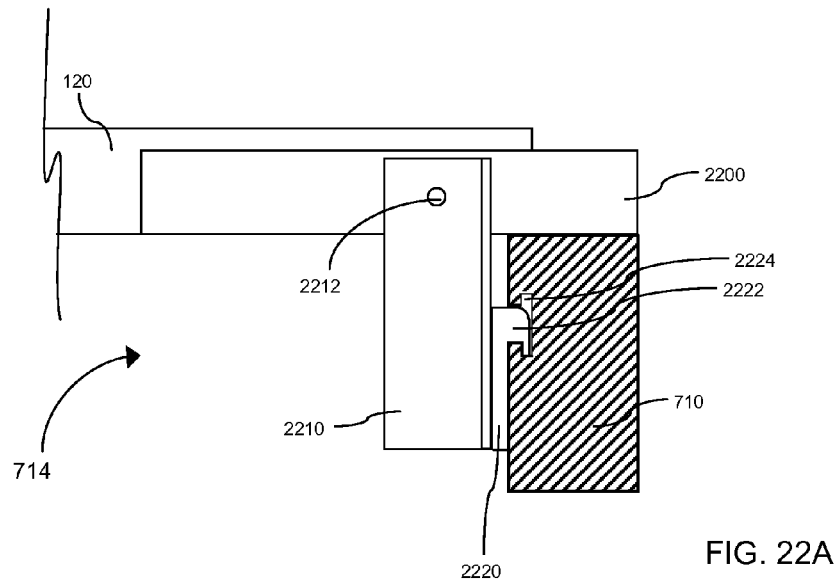
FIG. 22A is an end view of an embodiment of a longitudinal indexing member in a retracted position.
Figure 22B:
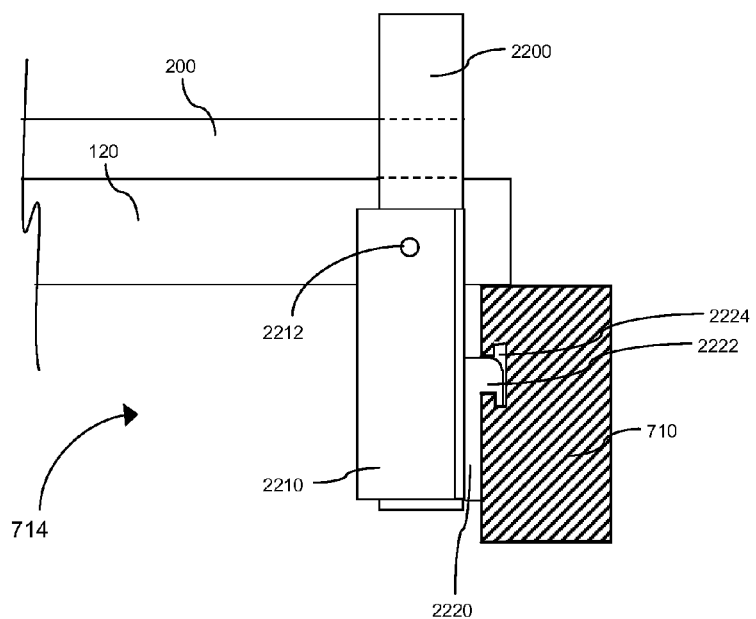
FIG. 22B is an end view of the embodiment shown in FIG. 22A in an extended position.

FIGS. 22A and 22B depict in greater detail the longitudinal index member 714. The longitudinal index member 714 may generally include a stanchion 2200 which is pivotable about a pivot member 2212 between an extended and a retracted position. The retracted position is depicted in FIG. 22A and the extended position is depicted in 22B. The longitudinal index member 714 may include a slot engagement member 2220 which includes a hooked portion 2222 that engages a slot 2224 provided on the stationary side member 710. Attached to the slot engagement member 2220 may be an angle member 2210. The angle member 2210 may include the pivot member 2212 such that the stanchion 2200 is pivotal thereabout. In this regard, when in the retracted position shown in FIG. 22A, the stanchion 2200 may not extend above the support member 120. However, when pivoted to the position shown in FIG. 22B, the stanchion 2200 may extend above support member 120.

Additionally, because the stanchion 2200 is provided to the inside of the stationary side member 710, a work piece 200 which is laterally indexed to an interior portion of the stationary side member 710 may abut the stanchion 2200 at a longitudinal end thereof. The hooked portion 2222 may allow for rapid engagement and disengagement with the slot 2224 such that the longitudinal index member 714 may be positioned anywhere along the length of the stationary member 710. Additionally, in that the stanchion 2200 may be rapidly pivoted between the extended position and the retracted position, the longitudinal index member 714 may be easily moved out of the way so as not to interfere with the work piece if so desired.

Figure 16:
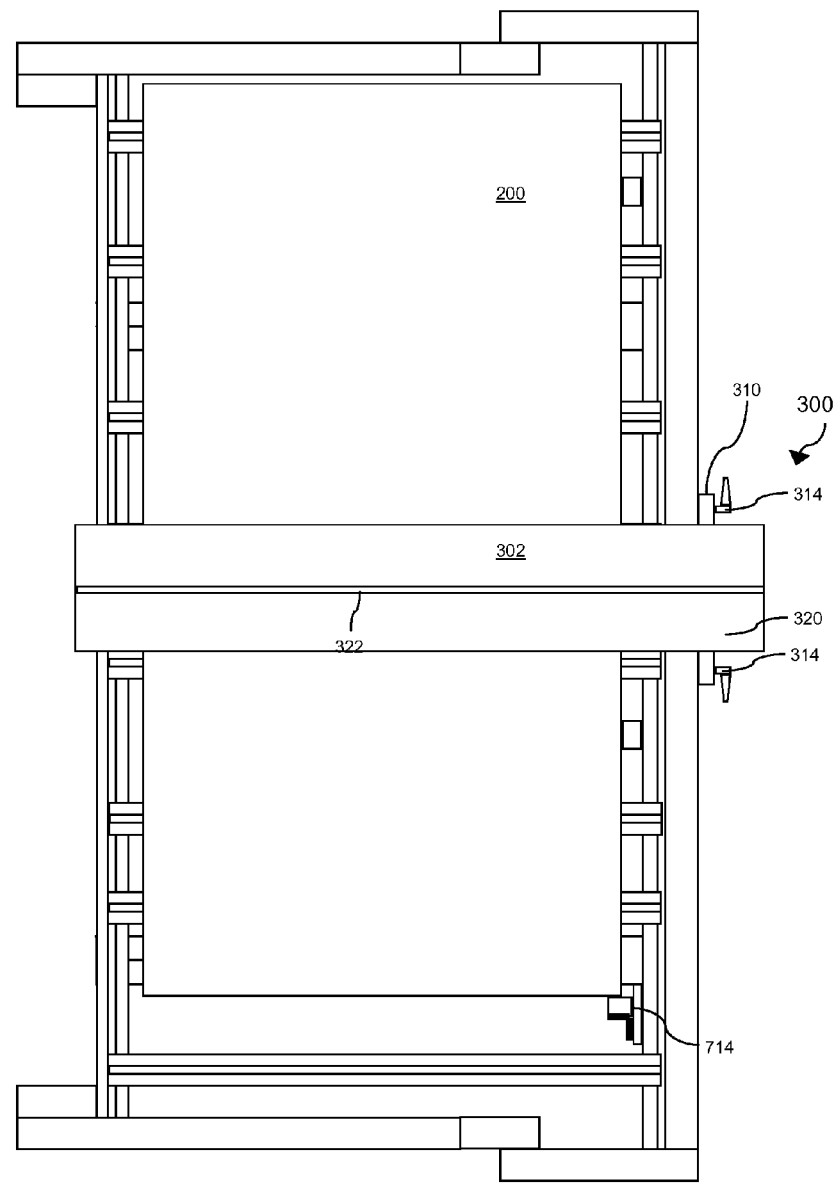
FIG. 16 is a top view of another embodiment of a tool guide attached to the embodiment shown in FIG. 7.
Figure 17A:
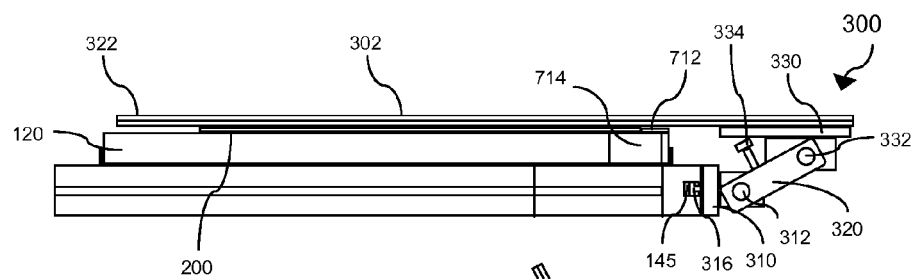
FIGS. 17A and 17B are end views of the embodiment of the tool guide shown in FIG. 16 in a work position and an auxiliary position, respectively.
Figure 17B:
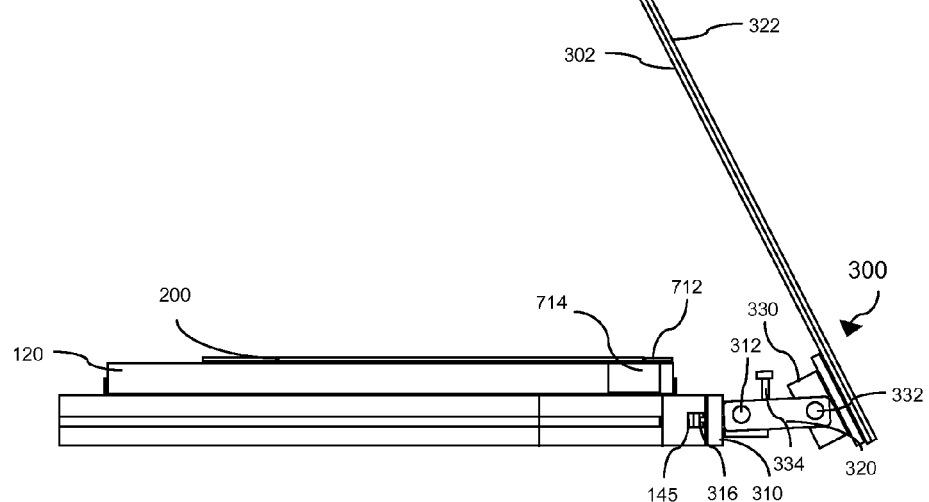

Another embodiment of a tool guide 300 is shown in FIGS. 16, 17A, and 17B. The tool guide 300 may include an attachment member 310 secured to the stationary side member 710. In a similar fashion to the attachment member 210, the attachment member 310 may include an attachment bolt 316 that engages a tool guide retention member 145 provided in the stationary side member 710. The tool guide retention member 145 may be a slot against which a shoulder of the attachment bolt 316 is engaged upon tightening of an adjustable handle 314, a nut, or other appropriate fastener. Accordingly, the tool guide 300 may be secured anywhere along substantially an entire length of the stationary side member 710 along which the tool guide retention member 145 extends.

The attachment member 310 may connect to a first pivot 312. A pivot arm 320 may also connect to the first pivot 312 such that the pivot arm 320 is disposed for pivotal movement with respect to the attachment member 310. The pivot arm 320 may also be attached to a track support 330 at a second pivot 332 so as to facilitate relative pivotal movement between the pivot arm 320 and the track support 330. A cantilevered tool guide track 302 may be attached to the track support 330. As such, the relative pivotal movement of the attachment member 310, pivot arm 320, and track support 330 may allow the cantilevered tool guide track 302 to be positioned flush against the work piece 200 as shown in FIGS. 16 and 17A.

An adjustment bolt 334 may be provided that threadably engages the pivot arm 320. Thus, the track support 330 may contact the head of the adjustment bolt 334 and limit the pivotal movement of the track support 330 with regard to the pivot arm 320. As such, adjustment of the height of the adjustment bolt 334 may allow for different thicknesses of materials while maintaining the guide track 302 flushed with the work piece 200. For instance, unthreading the adjustment bolt 334 with respect to the pivot arm 320 may provide for a thicker work piece 200 whereas threadably engaging more of the adjustment bolt 334 with the pivot arm 320 may allow for a thinner work piece 200. The adjustable bolt 334 may also be provided on the attachment member 310, and/or the track support 330 to adjust the height at which the cantilevered tool track 302 is positioned with respect to the work piece (i.e., to adjust for different work piece thicknesses). A crease 322 may be provided that may engage a corresponding tool base to guide a tool along the cantilevered tool guide track 302 to perform an operation on the work piece 200.

In order to provide additional rigidity to the assembly, the track support 330 may include a projection which coordinates with the crease 322 so as to prevent rotational movement of the guide track 302 with respect to the track support 330. The track 302 may be attached to the track support 330 by any appropriate means. For example, the track support 330 may be bolted to the cantilevered track such that the bolt engages the crease 322, passes through the track support 330, and is tightened so as to bolt the cantilevered tool track to the track support 330.

Additionally, FIG. 17B depicts the cantilevered tool guide track 302 in an auxiliary position wherein the tool guidetrack 302 is disposed away from the work piece 300. That is, the cantilevered tool guide track 302 extends away from the working plane. This may facilitate improved access to the work piece 200. As such, the cantilevered tool guide track 302 may be positioned in a work position (shown in FIGS. 16 and 17A) or the auxiliary position shown in FIG. 17B. In turn, the work piece 200 may be retrieved or positioned when the tool guide 300 is in the auxiliary position without having to move or remove the tool guide 300 from the desired position along the stationary side member 710. As can be appreciated best in FIG. 17B, the lateral index members 712 may be adjusted with respect to the work plane 150 (e.g., such that less of the index member 712 is provided above the work plane 150) to prevent interference with the tool guide track 302.

Figure 18:
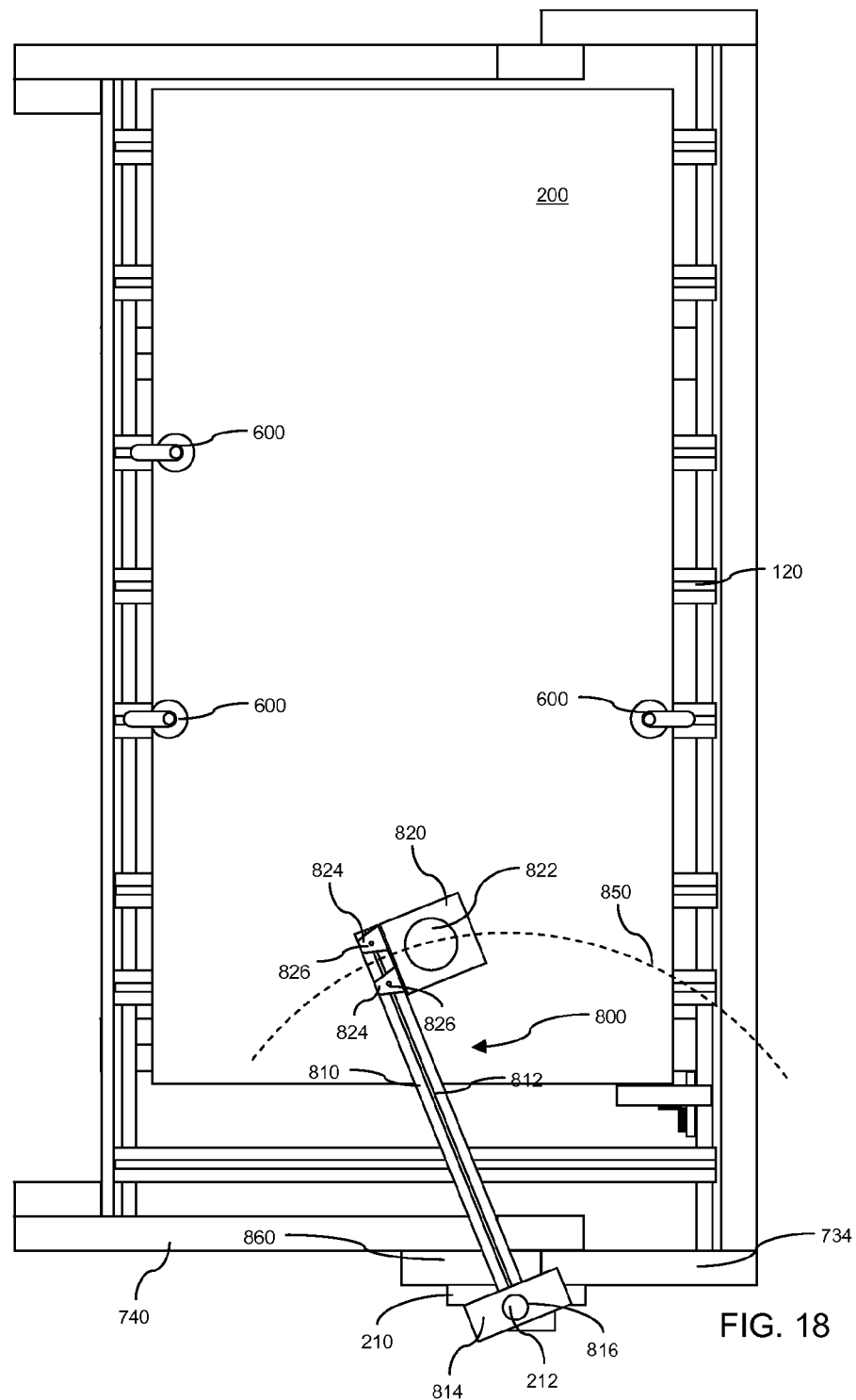
FIG. 18 is a top view of yet another embodiment of a tool guide as used in conjunction with the embodiment shown in FIG. 7.

Yet another embodiment of a tool guide 800 is shown in FIG. 18. The tool guide 800 may provide a guide to perform and operation through an arc 850 with respect to the work piece 200. The tool guide 800 may include a similar attachment member 210 as was described above with respect to the tool guide 202. As such, the attachment member 210 may be attached to either of the first or second folding end members 730 or 740, the stationary side member 710 or the sliding side member 720 depending upon the operation needed.

Also, in the embodiment as shown in FIG. 18, the ends of the table have a non-continuous surface due to the junction of the extension members 732 and 734 with the foldable end members 730 and 740, respectively. It may be desirable to attach a tool guide 210 in a manner that spans this non-continuous junction. Such an arrangement as shown in FIG. 18, where a supplemental support piece 860 may be attached to the second end member 740 adjacent to the junction of the extension member 734 and the second folding end member 740. In turn, the supplemental support 860 may also include a tool guide attachment member 145 that is spaced away from the end member 740 in a manner so as to align the tool guide attachment member 145 on the supplemental support piece 860 with a tool guide attachment member 145 on the extension member 734. As such, a tool guide 210 may be attached to the extension member 732 and supplemental support piece 860 in an instance wherein the tool guide 210 would otherwise overlap the junction between the non-continuous surfaces.

The attachment member 210 may also support a post 212 as described above. Unlike the tool guide 202, the post 212 used in the tool guide 800 may be substantially cylindrical adjacent to the intersection of the post 212 and the working plane. In this regard, the attachment member 210 described above with respect to the tool guide 202 may be flipped and the narrowed end 214 thereof may not be employed. The post 212 may be engaged by a pivot guide 814. The pivot guide 814 may include a collar that surrounds the post 212 and facilitates pivotal movement of the pivot guide 814 with respect to the post 212. Attached to the pivot guide 814 may be an arm 810. The arm 810 may define a channel 812 that may receive one or more bolts 826. The one or more bolts 826 may also pass through one or more corresponding brackets 824 that are secured to a tool base 820. As such, a tool 822 may be guided along the arc 850 upon rotational movement of the pivot guide 814 with respect to the post 212. As the brackets 824, and in turn the tool base 820, may be slideably positioned along the length of the arm 810, the radius of the arc 850 may be adjusted as necessary.

As the various operations may generate forces tending to cause the work piece 200 to slide or move in the working plane 150 (e.g., in a direction away from the indexing members 712 and 714), a number of clamps 600 may be provided to hold the work piece 200 in place against the support members 120. As discussed above, the clamps 600 may cooperate with a groove 160 defined in the support members 120 to clamp a work piece 200 to the support member 120.

Figure 19:
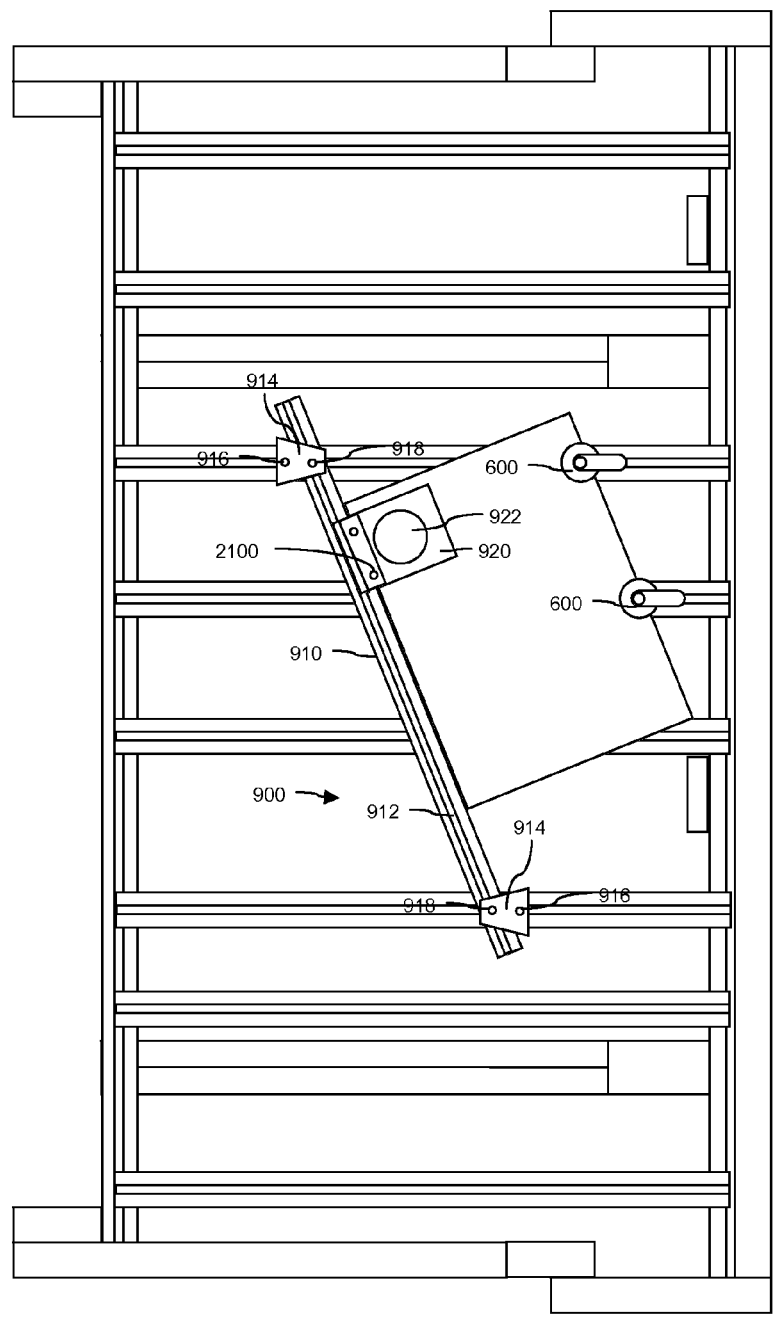
FIG. 19 is a top view of still another embodiment of a tool guide as used in conjunction with the embodiment shown in FIG. 7.

This arrangement wherein clamps 600 are used to secure a work piece 200 to the support members 120 is also shown in FIG. 19. Also shown in FIG. 19 is another embodiment of a tool guide 900 that may be employed to perform an operation on the work piece 200. The tool guide 900 includes a beam 910 defining a channel 912. The channel 912 may engage one or more beam attachment bolts 918 that in turn engage one or more brackets 914. The brackets 914 may also engage a support member attachment bolt 916 that engages a channel 160 of the support member 120. As such, upon tightening of the beam attachment bolt 918 and the support member attachment bolt 916, the beam 910 may be secured in place with respect to the work piece 200. As the attachment bolts 914 and 916 may be slideably adjusted with respect to the beam 910 and support members 120, the beam 910 may be positioned in any angle with respect to the table 700.

The channel 912 of the beam 910 may also receive an attachment member 2100. The attachment member 2100 may be attached to a tool base 920. Thus, the tool 920 may be slideably attached to the beam 910. As such, the beam 910 may guide the tool 922 in a desired path along the length of the beam 910 to perform an operation on the work piece 200.

In still other embodiments, a drop-in tool 1000 may be used in conjunction with a multifunction table according to present disclosure. Such a drop-in tool 1000 is depicted in FIG. 20.

The drop-in tool 1000 may be a router, table saw, miter saw, or any other appropriate tool. As shown, the drop-in tool 1000 may be a router having a router bit 1020 extending through an opening 1022. The router bit 1020 may in turn extend through the working plane. As stated above, alternative tools, such as table saws, miter saws, etc. may be used as well. A fence 1010 may be provided on the drop-in tool 1000. The fence 1010 may be adjustable to accommodate different operations as needed.

The drop-in tool 1000 may be positioned between adjacent support members 120. In this regard, two adjacent support members 120 may be positioned such that the span between the two adjacent support members 120 is roughly the width of the drop-in tool 1000. The drop in tool 1000 may have wings 1002 which extend over the adjacent support members 120 and support the drop-in tool 1000 on the support members 120. The space between the adjacent support members 120 may accommodate the drop-in tool such that a portion of the drop-in tool 1000 between the wings 1002 extends downward between the support members 120. Thus, the body of the drop-in tool 1000 (including the motor, mechanisms, tool chassis, etc.) may be disposed between the adjacent support members 120. In this regard, the drop-in tool 1000 may allow the multifunction table 700 to function as a table router, table saw, miter saw, etc., depending on the nature of the drop-in tool 1000.

Figure 20:
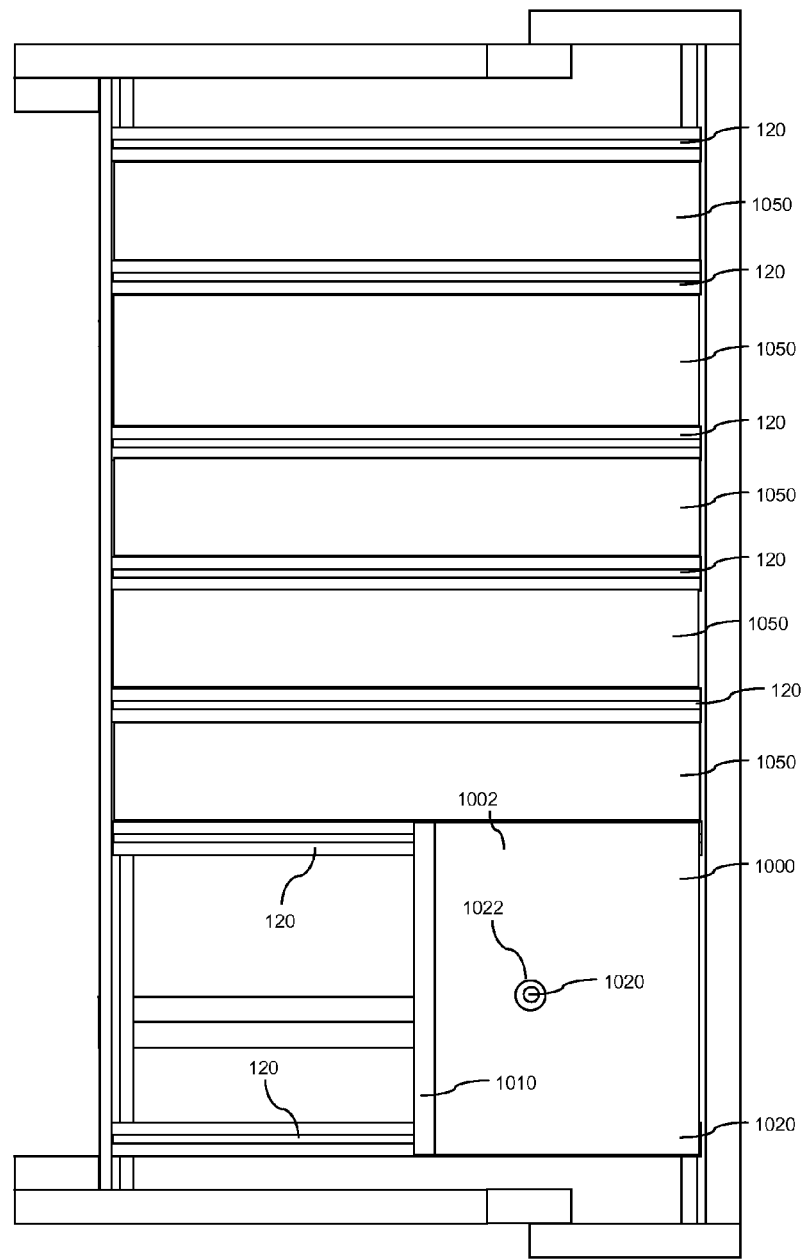
FIG. 20 is a top view of a drop-in tool used in conjunction with the embodiment shown in FIG. 7.

Additionally, as shown in FIG. 20, sheet material 1050 may be positioned generally between adjacent support members 120 to form a solid table top for the multifunction table 700. The sheet material 1050 may be of a thickness such that the sheet material 1050 rests on the support member 120 and forms a substantially continuous surface with the support member 120. Thus, the top surface of the sheet material 1050 may also lie in the working plane 150. Alternatively, or additionally, the thickness of the sheet material 1050 may be selected to be above or below the level of the working plane.

Figure 21:
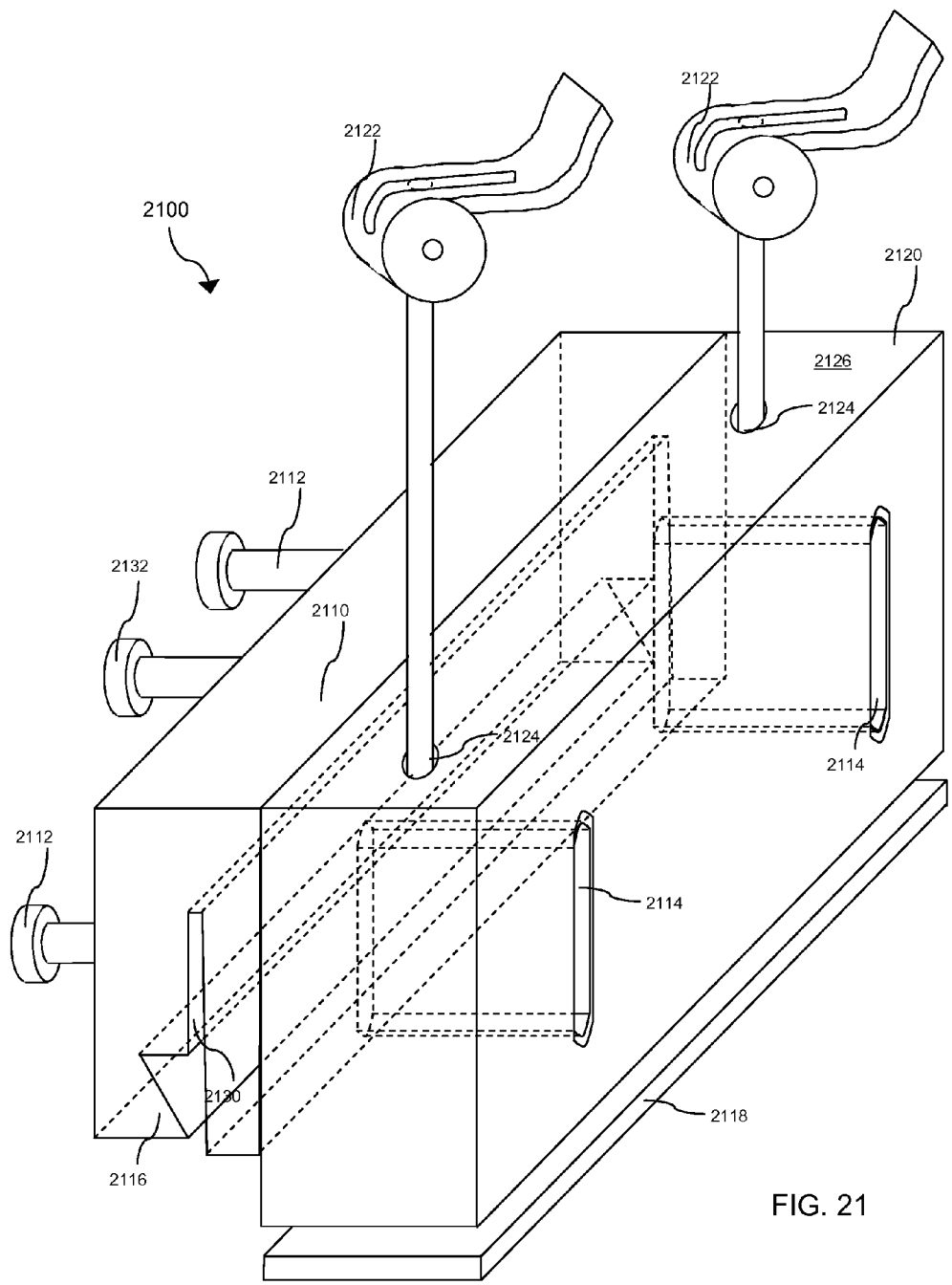
FIG. 21 is a partially exploded perspective view of an embodiment of a tool attachment member.

FIG. 21 depicts greater detail of the attachment member 2100 shown in FIG. 19 for securing a tool to a beam, pivot arm, or the like (e.g., as shown in FIG. 19). The attachment member 2100 may include a channel attachment block 2110 affixed to a tool attachment block 2120 by way of a number of bolts 2112. The bolts 2112 may pass through slotted holes 2114 provided on the tool attachment block 2120 such that the relative height of the channel attachment block 2110 and the tool attachment block 2120 may be changed. The bolt 2112 may pass through a portion of the channel attachment block 2110 and tighten against an interior face of a cut 2130. The cut 2130 may allow for some deflection of the channel engagement member 2116 with respect to the tool attachment block 2120. As such, the bolts 2112 may pass through a portion of the channel attachment block 2110 so that tightening of the bolts 2112 to secure the channel attachment block 2110 to the tool attachment block 2120 does not result in deflection of the channel engagement member 2116 with respect to the tool attachment block 2110.

The channel engagement member 2116 may be shaped to fit into a channel (e.g., channel 912 as shown in FIG. 19) provided on a beam, pivot arm, or the like. As such, the channel engagement member 2116 may slide along the length of the channel when the channel engagement member 2116 is in the neutral position with respect to the tool attachment block 2120. That is, when the channel engagement member 2116 is not deflected towards the tool attachment block 2120, the attachment member 2100 may slide smoothly along the channel. However, a deflection bolt 2132 may be provided that threadably engages the channel attachment block 2110 on opposing sides of the cut 2130. As such, upon threadable advancement of the deflection bolt 2132 with respect to the channel attachment block 2110, the cut 2130 may be pinched together. As such, the channel engagement member 2116 may be deflected towards the tool attachment block 2120. When engaged with a channel, this may cause this deflection of the channel engagement member 2116 toward the tool attachment block 2120 to cause the channel engagement member 2116 to bind with respect to the channel such that movement along the channel may be limited. In this regard, the deflection bolt 2132 may be tightened to secure the attachment member 2100 along the length of the channel. In contrast, loosening or removal of the deflection bolt 2132 may allow the attachment member 2100 to slide freely along the length of the channel.

The tool attachment block 2120 may also include a bottom plate 2118 which is clampingly engageable with the tool attachment block 2120 by way of a number of cammed bolts 2122 that pass through holes 2124 provided through the tool attachment block 2120 to engage the bottom plate 2118. As such, the cammed bolts 2122 may adjust the gap between the bottom plate 2118 and the tool attachment block 2120. In turn, the cammed bolts 2122 may cam against the top surface 2126 of the tool attachment block 2120 in order to clamp the bottom plate 2118 towards the tool attachment block 2120. In this regard, a tool base may be clampingly secured between the bottom plate 2118 and the tool attachment block 2120. The bolts 2112 and slotted holes 2114 may be used to adjust the height of the tool such that the tool base may be disposed in an appropriate level with respect to the work piece.

Other additional features or refinements may be provided to any of the foregoing embodiments. For example, reference marks may be provided at various locations on an embodiment of a table. For instance, a scale may be provided on the stationary side, the foldable end members, or the sliding side. Such a scale may be provided on any surface thereof to assist in performing an operation. The scale may be calibrated to an indexed position (e.g., as defined by indexing members) or other point (e.g., the table edge). Further still, the tool guides may include scales or other reference marks. This may include, without limitation, a scale on the support members, a beam or arm of a tool guide, a tool guide track, or other appropriate location. These reference marks and scales may provide distances or angle measurements to an indexed position of the work piece.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A work table comprising:
a frame comprising a slideable side member, a stationary side member, a first end member, and a second end member; and
multiple support members;
wherein:
the slideable side member is coupled to the first end member and the second end member;
the stationary side member is coupled to the first end member and the second end member;
the slideable side member is configured to be positioned at different times in a collapsed configuration and an extended configuration;
the slideable side member is configured to be (a) positioned opposite from the stationary side member and between the first end member and the second end member when the slideable side member is in the extended configuration and (b) proximate to the stationary side member, between the stationary side member and the first end member, and between the stationary side member and the second end member when the slideable side member is in the collapsed configuration;
the multiple support members are configured to be coupled to the frame when the slideable side member is configured in the extended configuration;
the multiple support members are configured to extend between the slideable side member and the stationary side member when coupled to the frame; and
the multiple support members are configured to be able to support a work piece in a working plane when coupled to the frame;
the slideable side member comprises a first hinge and a second hinge;
the first end member comprises a first channel;
the second end member comprises a second channel;
the first channel is configured to receive the first hinge to couple the slideable side member to the first end member; and
the second channel is configured to receive the second hinge to couple the slideable side member to the second end member.

2. The work table of claim 1, wherein:
the first end member and the second end member are configured to pivot with respect to the stationary side member.

3. The work table of claim 1 further comprising:
multiple base members configured to be coupled to the frame, the multiple base members being configured to receive multiple stands configured to support the work table.

4. The work table of claim 3, wherein:
the multiple base members are configured to be coupled to the frame at the stationary side member and to be configured in a stowed position substantially parallel to the stationary side member and a deployed position substantially perpendicular to the stationary side member.

5. The work table of claim 3, further comprising:
the multiple stands;
wherein:
the multiple stands comprise multiple saw horses.

6. The work table of claim 1 wherein:
the slideable side member is configured to be parallel to the stationary side member in both the extended configuration and the collapsed configuration.

7. The work table of claim 1 wherein:
when the slideable side member is configured in the extended configuration, the first end member is parallel to the second end member.

8. The work table of claim 1 wherein:
the multiple support members are configured to be removably and lockably coupled to the frame when the slideable side member is configured in the extended configuration.

9. The work table of claim 1 wherein:
when the multiple support members are coupled to the frame, the multiple support members are configured to extend parallel to each other between the slideable side member and the stationary side member.

10. The work table of claim 1, further comprising:
a drop-in tool configured to be positioned between two support members of the multiple support members when the two support members of the multiple support members are coupled to the frame.

11. The work table of claim 10, wherein:
the drop-in tool comprises one of a router, a table saw, or a miter saw.

12. The work table of claim 1, wherein:
at least one support member of the multiple support members comprises a groove extending along at least a portion of the at least one support member.

13. The work table of claim 12, wherein at least one of:
the groove is configured to receive a clamp, the clamp comprising an attachment member configured to be received at the groove and a clamping member operatively coupled to the attachment member and contractable to secure the work piece to the at least one support member; or
the groove is configured to remain accessible when the at least one support member of the multiple support members is coupled to the frame.

14. The work table of claim 1, wherein:
at least one support member of the multiple support members comprises a work piece contact surface; and
at least one of (i) the work piece contact surface comprises a material having one or more physical properties of the work piece or (ii) the work piece contact surface is replaceable.

15. The work table of claim 1, further comprising:
an indexing member configured to be coupled to the frame; wherein:
  the indexing member is positionable in an extended position and a retracted position;
  when positioned in the extended position, the indexing member extends through the working plane; and
  when positioned in the retracted position, the indexing member does not extend through the working plane.

16. The work table of claim 1, further comprising:
a tool guide;
wherein:
  the tool guide is configured to be coupled to the frame;
  the tool guide is configured to receive a tool; and
  when the tool guide is coupled with the frame and the tool guide has received the tool, the tool guide limits movement of the tool with respect to the frame.

17. A work table comprising:
a frame comprising a slideable side member, a stationary side member, a first end member, and a second end member; and
multiple support members;
wherein:
  the stationary side member comprises:
    a first end;
    a second end opposite the first end;
    a first extension member at the first end;
    a second extension member at the second end;
    a first hinge coupled to the first extension member; and
    a second hinge coupled to the second extension member;
  the stationary side member is coupled to the first end member by the first hinge and to the second end member by the second hinge;
  the slideable side member comprises:
    a third hinge; and
    a fourth hinge;
  the slideable side member is coupled to the first end member by the third hinge and to the second end member by the fourth hinge;
  the slideable side member is configured to be positioned at different times in a collapsed configuration and an extended configuration;
  the slideable side member is configured to be (a) positioned opposite from the stationary side member and between the first end member and the second end member when the slideable side member is in the extended configuration and (b) proximate to the stationary side member, between the stationary side member and the first end member, and between the stationary side member and the second end member when the slideable side member is in the collapsed configuration;
  the multiple support members are configured to be coupled to the frame when the slideable side member is configured in the extended configuration;
  the multiple support members are configured to extend between the slideable side member and the stationary side member when coupled to the frame; and
  the multiple support members are configured to be able to support a work piece in a working plane when coupled to the frame.

18. The work table of claim 17, wherein:
the first end member is configured to pivot with respect to the first extension member; and
the second end member is configured to pivot with respect to the second extension member.

19. The work table of claim 18, wherein:
the first end member and the second end member are configured to be perpendicular to the stationary side member when the slideable side member is configured in the extended configuration, and are configured to be parallel to the stationary side member when the slideable side member is configured in the collapsed configuration.

20. The work table of claim 17, wherein:
the first extension member and the second extension member are parallel to each other.

21. The work table of claim 17, wherein:
the first end member comprises a first channel;
the second end member comprises a second channel;
the first channel is configured to receive the third hinge to couple the slideable side member to the first end member; and
the second channel is configured to receive the fourth hinge to couple the slideable side member to the second end member.

22. The work table of claim 21, wherein:
the first extension member comprises a third channel;
the second extension member comprises a fourth channel;
the third channel is configured to receive the first hinge to couple the stationary side member to the first end member; and
the fourth channel is configured to receive the second hinge to couple the stationary side member to the second end member.

23. The work table of claim 22 wherein:
(i) at least one of: (a) the third hinge is configured to move along the first channel, (b) the fourth hinge is configured to move along the second channel, (c) the first hinge is configured to move along the third channel, or (d) the second hinge is configured to move along the fourth channel when (ii) the slideable side member is altered from the extended configuration to the collapsed configuration.

24. The work table of claim 17, further comprising:
an indexing member configured to be coupled to the frame; wherein:
   the indexing member is positionable in an extended position and a retracted position;
   when positioned in the extended position, the indexing member extends through the working plane; and
   when positioned in the retracted position, the indexing member does not extend through the working plane.

25. A work table comprising:
a frame comprising a slideable side member, a stationary side member, a first end member, and a second end member; and
multiple support members;
wherein:
   the stationary side member comprises:
      a first end;
      a second end opposite the first end;
      a first extension member at the first end;
      a second extension member at the second end;
      a first hinge coupled to the first extension member; and
      a second hinge coupled to the second extension member;
   the stationary side member is coupled to the first end member by the first hinge and to the second end member by the second hinge;
   the slideable side member comprises:
      a third hinge; and
      a fourth hinge;
   the slideable side member is coupled to the first end member by the third hinge and to the second end member by the fourth hinge;
   the slideable side member is configured to be positioned at different times in a collapsed configuration and an extended configuration;
   the slideable side member is configured to be (a) positioned opposite from the stationary side member and between the first end member and the second end member when the slideable side member is in the extended configuration and (b) proximate to the stationary side member, between the stationary side member and the first end member, and between the stationary side member and the second end member when the slideable side member is in the collapsed configuration;
   the multiple support members are configured to be removably and lockably coupled to the frame when the slideable side member is configured in the extended configuration;
   the multiple support members are configured to extend parallel to each other between the slideable side member and the stationary side member when coupled to the frame;
   the multiple support members are configured to be able to support a work piece in a working plane when coupled to the frame;
   the first end member is configured to pivot with respect to the first extension member;
   the second end member is configured to pivot with respect to the second extension member;
   the first end member and the second end member are configured to be perpendicular to the stationary side member when the slideable side member is configured in the extended configuration, and are configured to be parallel to the stationary side member when the slideable side member is configured in the collapsed configuration;
   the first extension member and the second extension member are parallel to each other; and
   the slideable side member is configured to be parallel to the stationary side member in both the extended configuration and the collapsed configuration.

* * * * *